US008387747B2

(12) United States Patent
Koike et al.

(10) Patent No.: US 8,387,747 B2
(45) Date of Patent: Mar. 5, 2013

(54) SOUNDPROOF PANEL AND SOUNDPROOF STRUCTURE

(75) Inventors: Masaru Koike, Tsuchiura (JP); Tomoaki Kimura, Okayama (JP); Masato Iizumi, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 13/143,157

(22) PCT Filed: Jan. 13, 2010

(86) PCT No.: PCT/JP2010/050274
§ 371 (c)(1),
(2), (4) Date: Jul. 1, 2011

(87) PCT Pub. No.: WO2010/082582
PCT Pub. Date: Jul. 22, 2010

(65) Prior Publication Data
US 2011/0266088 A1    Nov. 3, 2011

(30) Foreign Application Priority Data

Jan. 14, 2009 (JP) .................................. 2009-006138
Mar. 2, 2009 (JP) .................................. 2009-048437

(51) Int. Cl.
*E04B 2/02* (2006.01)
(52) U.S. Cl. ........................................ 181/290; 181/284
(58) Field of Classification Search .................. 181/290, 181/284
See application file for complete search history.

(56) References Cited

U.S. PATENT DOCUMENTS

| | | | | |
|---|---|---|---|---|
| 4,084,367 A | * | 4/1978 | Saylor et al. | 428/113 |
| 4,886,696 A | * | 12/1989 | Bainbridge | 428/184 |
| 5,414,232 A | * | 5/1995 | Wilson | 181/292 |
| 6,220,388 B1 | * | 4/2001 | Sanborn | 181/290 |
| 6,371,242 B1 | * | 4/2002 | Wilson et al. | 181/292 |
| 6,508,897 B1 | | 1/2003 | Yamaguchi et al. | |

(Continued)

FOREIGN PATENT DOCUMENTS

| | | |
|---|---|---|
| JP | 3 50150 | 5/1991 |
| JP | 10 061342 | 3/1998 |

(Continued)

OTHER PUBLICATIONS

International Search Report issued Mar. 30, 2010 in PCT/JP10/050274 filed Jan. 13, 2010.

*Primary Examiner* — Forrest M Phillips
(74) *Attorney, Agent, or Firm* — Oblon, Spivak, McClelland, Maier & Neustadt, L.L.P.

(57) ABSTRACT

A soundproof panel comprising a nonwoven structural member and a board member is prepared. The nonwoven structural member comprises a thermal adhesive fiber under moisture which is melt-bonded to a fiber of the structural member to fix the fibers. The soundproof panel may be a soundproof panel 1 comprising a nonwoven structural member 2 and a honeycomb member 3 stacked thereto. Moreover, the soundproof panel may be a soundproof panel comprising a board-like nonwoven structural member and first and second surface members stacked to first and second sides of the board-like nonwoven structural member, respectively. Further, the soundproof panel may be a soundproof panel having first and second surface members stacked through a square-pole rail member comprising a nonwoven structural member. The soundproof panel of the present invention has toughness for the lightweight design and has excellent sound absorption and sound insulation properties.

20 Claims, 7 Drawing Sheets

| U.S. PATENT DOCUMENTS | | | |
|---|---|---|---|
| 6,840,349 B2 * | 1/2005 | Andre et al. | 181/292 |
| 7,337,874 B1 * | 3/2008 | Ritto | 181/199 |
| 8,079,443 B2 * | 12/2011 | Keller | 181/292 |
| 2003/0032358 A1 | 2/2003 | Yamaguchi et al. | |
| 2003/0054721 A1 | 3/2003 | Yamaguchi et al. | |
| 2004/0238276 A1 * | 12/2004 | Matias et al. | 181/290 |
| 2006/0060421 A1 * | 3/2006 | Sarin et al. | 181/290 |
| 2006/0118357 A1 * | 6/2006 | Braun et al. | 181/290 |
| 2006/0124388 A1 * | 6/2006 | Pompei | 181/290 |
| 2008/0314680 A1 * | 12/2008 | Doneux et al. | 181/290 |
| 2009/0130939 A1 * | 5/2009 | Kimura et al. | 442/364 |
| 2009/0173571 A1 * | 7/2009 | Keller | 181/292 |
| 2009/0250291 A1 * | 10/2009 | Sparks et al. | 181/290 |

| FOREIGN PATENT DOCUMENTS | | |
|---|---|---|
| JP | 2000 250562 | 9/2000 |
| JP | 2001 081878 | 3/2001 |
| JP | 2001 123368 | 5/2001 |
| JP | 2001 222286 | 8/2001 |
| JP | 2002 227323 | 8/2002 |
| JP | 2006 299789 | 11/2006 |
| JP | 2007 137045 | 6/2007 |
| JP | 2007 191808 | 8/2007 |
| JP | 2007 314904 | 12/2007 |
| WO | 2007 116676 | 10/2007 |

* cited by examiner (a)　　　　　　　　　(b)

SOUNDPROOF PANEL AND SOUNDPROOF STRUCTURE

TECHNICAL FIELD

The present invention relates to a soundproof panel (a sound absorption or sound insulation panel), a soundproof structure (a sound absorption or sound insulation structure) having the panel, and a soundproof method using the panel. The soundproof panel is used as a component member for an architectural structure (for example, a house, a plant installation or equipment, a building, a hospital, a school, a gymnasium, a lyceum, a public hall or community center, a concert hall, and a soundproof wall for expressway) or a vehicle (for example, a car such as an automobile, and a flying machine or aircraft) and is available for a sound absorption or sound insulation member and others.

BACKGROUND ART

Conventionally, as a soundproofing (sound insulation) or acoustic measure of an architectural structure (e.g., a house, an office building, a plant, and a concert hall), a sound absorption member (or an acoustic member), which is typified by a glass wool or a rock wool, is attached to a ceiling or wall thereof. Among others, from the respects such as economical efficiency, easiness of construction, and environmental safety, a panel member comprising a glass wool is widely used as such a sound absorption member.

However, the conventional panel has a low absorption coefficient, and the sound absorption power thereof is often insufficient for a room having a necessity of room acoustics. Thus, according to the usage, further attachment of a sound absorption panel comprising a porous material or others to a sound insulation panel with a fastening material (such as an adhesive, a nail, or a screw) is also conducted. However, a sound absorption member comprising a porous material (such as a glass wool or a rock wool) usually has a low strength and is easily damaged in conveyance, installation, construction, or the like. In addition, the sound absorption member has a poor sound absorption characteristic, particularly a poor sound absorption characteristic at a low-frequency zone.

Japanese Patent Application Laid-Open No. 2001-081878 (JP-2001-081878A (Patent Document 1)) discloses a sound absorption panel comprising a board-like structure formed by a plurality of cells, a board-like back surface member adhered to the back side of the structure, a long member adhered to both the cut surface of the structure and the back surface member, and a board-like front surface member having air-permeability and adhered to both the front side of the structure and the long member. In this document, examples of the front surface member includes a porous material such as a nonwoven fabric, and examples of the back surface member includes a material having no air-permeability, such as a medium or hard fiber board, a plywood, or a gypsum board. Further, this document discloses that the sound absorption panel has a structural strength necessary for an interior material of an architectural structure, exhibits a sound absorption effect in a wide range of a sound area, is lightweight, matches the interior of the architectural structure, and reduces the cost by simple construction.

Moreover, Japanese Patent Application Laid-Open No. 2002-227323 (JP-2002-227323A, Patent Document 2) discloses a sound absorption panel comprising a honeycomb core member having an opened front face and an opened back face, front face side and back face side permeable sheets overlaid on the front and back faces of the honeycomb core member, respectively, and a back face cover arranged over the back face side of the back face side permeable sheet for forming an air layer between the back face side permeable sheet and itself, and an installation structure for the panel. In this document, examples of the front face side and back face side permeable sheets includes a nonwoven fabric and a cloth. Further, the document discloses that the sound absorption panel and the installation structure for the panel can provide great reduction in weight while securing sound absorption performance equivalent to that of a conventional one or more.

These sound absorption panels, however, have a low toughness or a low rigidity (or stiffness) and have limited uses. In addition, these sound absorption panels have an insufficient sound absorption performance.

Further, International Publication No. WO 2007/116676 (Patent Document 3) discloses that a nonwoven fiber assembly containing a thermal adhesive fiber under moisture is heat-treated with a high-temperature water vapor to produce a hard shaped product having a nonwoven structure (or nonwoven fabric structure) and having the thermal adhesive fiber melt-bonded at a uniform bonded ratio in a thickness direction. This document discloses that the hard shaped product is available for a building board.

When the hard shaped product is used for a building board, however, a high soundproofing or sound insulation property necessary for room acoustics or others is unsatisfied. Moreover, although the hard shaped product has a form or configuration stability which allows use of the shaped product as an independent board, the sound insulation property of the hard shaped product is insufficient due to the fiber aggregate structure. Further, this document is silent on a structure of a panel, and the like.

Moreover, conventionally, for the purpose of sound insulation, a panel (a sound insulation panel) used for a component member (e.g., a door, a wall, a partition, a ceiling, and a floor) of an architectural structure achieves an effect of intercepting sound or noise by increasing a sound reduction index (or sound transmission loss) thereof. It is widely known that a sound reduction index depends on the mass law. However, for a sound insulation panel of a building made by a lightweight structure (such as a wooden or steel structure), the weight increase of the panel is restricted by structural or economic circumstances. In particular, for a movable partition or a fitting (or fixture), a lightweight one is required in order to improve the operationality.

Since it is difficult to improve a sound insulation effect by a panel having a single-wall (single-board) structure, a sound insulation panel having a double-wall structure is widely known as a lightweight sound insulation panel having a large sound reduction index. For the double-wall structure, a wooden or metal rail member (frame member or bar member) is used to fix (or join) a front surface member and a back surface member with separation (or at an interval). However, the rail member transmits the solid-borne sound and reduces the sound reduction index of the sound insulation panel. Further, it is known that a distance of about 200 mm between both surface members of a double-wall structure is effective. However, since a sound insulation panel having a large thickness reduces an interior space of a room, there is a limit to thicken the sound insulation panel. Thus, in order to reduce the thickness of the panel and secure a necessary sound reduction index, a sound absorption material (e.g., a glass wool) is disposed between both surface members forming the sound insulation panel. In other words, for the formation of a lightweight sound insulation panel, the rail member, which fixes (or joins) both surface members with separation (or at an interval), is required, and installation of the sound absorption material between both surface members is effective.

As a type of lightweight sound insulation panels, Japanese Patent Application Laid-Open No. 10-61342 (JP-10-61342A, Patent Document 4) discloses a soundproof door in which a door main body has a double-wall structure formed by an outer frame and surface boards added and provided on both faces of the outer frame, and a reinforcing rail member comprising an elastic body and fixed between both inner and outer surface boards is disposed inside the door main body. In the soundproof door, a sound absorption member (e.g., a glass wool) is filled in a clearance of the double-wall structure, and solid-borne sound is reduced by forming the rail member with the elastic body (e.g., a styrene foam).

However, since such an elastic body has a low strength, it is difficult to secure a sufficient strength against a force which pushes the surface member. Thus a wood or metal material having a strength has to be used for the frame of the panel. Moreover, in order to improve the sound insulation property, an additional sound absorption member is necessary along with the double-wall structure. Further, since such a fibrous sound absorption member (such as a glass wool) hardly has a compressive strength and has no freestanding property (form or configuration stability), a rail member is necessary. However, a sound wave which transmits a panel provided with the rail member and the fibrous sound absorption member induces a transmission resonance, and the sound insulation property is decreased.

Further, Japanese Patent Application Laid-Open No. 2000-250562 (JP-2000-250562A, Patent Document 5) discloses a soundproof panel in which a frame is formed by vertical rails, horizontal rails and a middle bone to a framework of a square shape, thin front surface boards are affixed to both inner and outer surfaces of the frame, and middle rails consisting of a plurality of sheets of rectangular strip-shaped reinforcing boards are respectively attached to rear surfaces of both inner and outer surface boards and arranged in a liberated and alternately non-confronting state without contact between the vertical rails and between the horizontal rails facing each other of the frame. In this panel, the middle rails for fixing both inner and outer surface boards of the double-wall structure are separately arranged between the inner and outer surface boards, the inner and outer surface boards are disposed in a non-contact state by interposing a buffer therebetween, and a fire-retardant and soundproof material (e.g., a glass wool) is disposed in spaces existing both left and right sides of the middle rails.

The panel, however, has a complicated constitution of the rail member. Moreover, a wood or metal material having a strength has to be used for the frame of the panel. In addition, in order to improve the sound insulation property, a sound absorption member is necessary.

Meanwhile, the sound insulation panel requires translucency or transparency depending on applications. For example, Japanese Patent Application Laid-Open No. 2006-299789 (JP-2006-299789A, Patent Document 6) discloses a translucent soundproof board in which a translucent sound absorption member and a transparent sound insulation member are attached on a panel frame with some distance kept therebetween, wherein the translucent sound absorption member is formed by piling up a translucent film material and a translucent porous board. In this document, examples of the film material include a synthetic resin film, and examples of the porous board include a net (or mesh) porous body formed by a synthetic resin, a glass, or a metal material. In this translucent soundproof board, however, the sound insulation property is hardly compatible with the lightness in weight.

RELATED ART DOCUMENTS

Patent Documents

Patent Document 1: JP-2001-081878A (claim 1, Paragraph Nos. [0010] [0011] [0014] [0020])
Patent Document 2: JP-2002-227323A (claims, Paragraph Nos. [0017] [0027])
Patent Document 3: International Publication No. WO2007/116676 (Claims, Examples)
Patent Document 4: JP-10-61342A (claim 1, Paragraph Nos. [0009] [0010])
Patent Document 5: JP-2000-250562A (Claims 1 and 3, Paragraph No. [0015])
Patent Document 6: JP-2006-299789A (claim 1)

SUMMARY OF THE INVENTION

Problems to be Solved by the Invention

It is therefore an object of the present invention to provide a soundproof panel (a sound absorption or sound insulation panel, a panel member) which has lightness in weight and toughness and has excellent sound absorption and sound insulation properties, as well as a sound absorption or sound insulation structure (a soundproof structure) having the panel and a soundproof method using the panel.

Another object of the present invention is to provide a soundproof panel having high sound absorption and sound insulation properties to sound waves with a wide range of frequencies including a low-frequency zone, as well as a soundproof structure having the panel and a soundproof method using the panel.

It is still another object of the present invention to provide a soundproof panel having an excellent balance of sound absorption and sound reflection and being available for an application which requires high room acoustics, as well as a soundproof structure having the panel and a soundproof method using the panel.

It is a further object of the present invention to provide a soundproof panel having a high sound insulation property to both a solid-borne sound and an air-borne sound in spite of a simple structure (construction) and lightweight design thereof, as well as a soundproof structure having the panel and a soundproof method using the panel.

It is a still further object of the present invention to provide a soundproof panel by which a deterioration of a sound insulation effect due to transmission resonance is inhibited, as well as a soundproof structure and a soundproof method using the panel.

It is another object of the present invention to provide a soundproof panel having a surface easily attachable to various types of surface members with a high adhesion strength, as well as a soundproof structure having the panel and a soundproof method using the panel.

A still another object of the present invention is to provide a soundproof panel having an excellent translucency, as well as a soundproof structure having the panel and a soundproof method using the panel.

It is a further object of the present invention to a soundproof panel which has high sound absorption and sound insulation properties to a sound wave having a frequency in a high-frequency zone, as well as a soundproof structure having the panel and a soundproof method using the panel.

Means to Solve the Problems

The inventors of the present invention made intensive studies to achieve the above objects and finally found that a stacked (or laminated or layered) product comprising a board member (a honeycomb member or a surface member) and a nonwoven structural member in which a thermal (heat) adhesive fiber under moisture is moderately bonded to a fiber of the nonwoven structural member has toughness for the lightweight design and excellent sound absorption and sound insulation properties. The present invention was accomplished based on the above findings.

That is, the soundproof panel (or panel member) of the present invention comprises a first nonwoven structural member comprising a thermal adhesive fiber under moisture (or moistenable-thermal adhesive fiber, moistenable adhesive fiber under heat, or adhesive fiber under heat and moisture) which is melt-bonded to a fiber of the first nonwoven structural member to fix the fibers, and a board member, wherein the first nonwoven structural member has a bonded fiber ratio (or ratio of bonded fiber) of 3 to 85% and an apparent density of 0.03 to 0.7 g/cm$^3$. The first nonwoven structural member may be in the form of a board and may have the following characteristics (1) to (5):

(1) the thermal adhesive fiber contains a thermal adhesive resin under moisture forming a continuous area of the surface of the fiber in a longitudinal direction thereof, (2) the thermal adhesive fiber is arranged in a direction approximately parallel to a surface direction of the structural member, (3) the apparent density is 0.05 to 0.7 g/cm$^3$, (4) the bonded fiber ratio is 3 to 85% in each of three areas and the proportion of the minimum value relative to the maximum value among the bonded fiber ratios in each of the three areas is not less than 50%, providing that the three areas are obtained by cutting the structural member in the thickness direction for giving a cross section, and dividing the cross section in a direction perpendicular to the thickness direction equally into three, and (5) the first nonwoven structural member has a maximum bending stress of not less than 0.05 MPa in at least one direction, and a bending stress of not less than 1/5 of the maximum bending stress at 1.5 times as large as a bending deflection at the maximum bending stress.

The board member may have a honeycomb structure (or may be in the form of a honeycomb), and the honeycomb member may be in the form of a board comprising a plurality of thin sheets or a continuous thin sheet, each of the thin sheets or the continuous thin sheet may have a thickness of 0.01 to 5 mm, the board has a thickness of 5 to 200 mm, and the honeycomb member may have cells, each having an average diameter of 1 to 100 mm. In the soundproof panel of the present invention, the first nonwoven structural member and the honeycomb member may be in the form of a board, the thickness ratio of the first nonwoven structural member relative to the honeycomb member [the first nonwoven structural member/the honeycomb member] may be 1/1 to 1/10. Moreover, the first nonwoven structural member may be stacked (or laminated or layered) to a first side of the honeycomb member, and a second nonwoven structural member may be stacked (or laminated or layered) to a second side of the honeycomb member. Further, the first nonwoven structural member may be stacked to a first side of the honeycomb member, and a reflector may be stacked to a second side of the honeycomb member.

In the soundproof panel of the present invention, the board member may be a first surface member, the first nonwoven structural member may be a board structural member having an apparent density of 0.03 to 0.08 g/cm$^3$, and the first surface member may be stacked to a first side of the board structural member, and a second surface member may be stacked to a second side of the board structural member. In this soundproof panel, the board member may be a first surface member, the first nonwoven structural member may form a rail member (frame member or bar member) having an apparent density of 0.03 to 0.5 g/cm$^3$ (particularly, 0.06 to 0.5 g/cm$^3$), and the first surface member and a second surface member may be stacked through the rail member. The soundproof panel may have a thickness of 20 to 100 mm, and the thickness ratio of the first nonwoven structural member relative to each surface member [the first nonwoven structural member/each surface member] may be about 50/1 to 1/2. The first and second surface members may have a translucency; when a light enters vertically with respect to a first surface of the first nonwoven structural member and is transmitted from a second surface thereof, the ratio of a transmitted light strength in a 45° direction with respect to a normal line of the second surface relative to a transmitted light strength in a direction parallel to the normal line may be not less than 50%; and the thickness ratio of the first nonwoven structural member relative to each surface member [the first nonwoven structural member/the each surface member] may be about 30/1 to 10/1. The first nonwoven structural member may be joined to the first and second surface members with an adhesive or a pressure sensitive adhesive.

The soundproof panel of the present invention may be a sound absorption or sound insulation panel.

The present invention also includes a soundproof structure having the soundproof panel installed in an object site that requires sound absorption or sound insulation. The soundproof structure may have an air layer (for example, an air layer having a thickness of about 5 to 100 mm) lying between the soundproof panel and the object site that requires sound absorption or sound insulation. Further, the present invention includes a method for soundproof using the soundproof panel.

Incidentally, throughout this description, the term "rail member" means a pillar member which is partly interposed between a first surface member and a second surface member for forming a clearance (a space) between the both surface members.

Effects of the Invention

The soundproof panel of the present invention, which is a stacked (or laminated or layered) product comprising a board member (a honeycomb member or a surface member) and a nonwoven structural member having a fiber moderately fixed with a thermal (heat) adhesive fiber under moisture, has toughness for the lightweight design and excellent sound absorption and sound insulation properties (in particular, a sound absorption property in a low-frequency zone).

Moreover, when the board member comprises a honeycomb member, the soundproof panel achieves high sound absorption and sound insulation properties to sound waves with a wide range of frequencies including a low-frequency zone by adjusting (or controlling) the thickness of the honeycomb member or that of an air layer. Further, combination use of a reflector with the honeycomb member achieves a well-balanced sound absorption and sound reflection and allows the soundproof panel to be used for an application which requires high room acoustics.

Further, when the board member comprises a surface member, the soundproof panel comprises the surface member and a nonwoven structural member having a fiber moderately fixed with a thermal (heat) adhesive fiber under moisture, and has an improved sound insulation property to both solid-borne sound and air-borne sound in spite of a simple and lightweight structure (construction) thereof. Furthermore, since the nonwoven structural member may serve as a shaped product (panel component member) or rail member having a sound absorption property due to a fiber aggregate structure thereof and a high strength (rigidity (or stiffness) or hardness) thereof, the conventional rail member and fibrous sound absorption member are unnecessary. Thus, the transmission resonance of the fibrous sound absorption member due to the rail member is not caused, which restricts deterioration of the sound insulation effect. Moreover, the nonwoven structural member having the fiber aggregate structure has an excellent adhesiveness (bondability) to an adhesive or a pressure sensitive adhesive, allows various kinds of surface members to be simply attached to a surface of the panel with a high adhesion strength, and allows the selectivity of the surface member to be higher. Moreover, since the nonwoven structural member has an excellent translucency, combination use of the nonwoven structural member with a surface member having a translucency (e.g., a transparent resin board) improves the translucency of the soundproof panel (sound insulation panel). Furthermore, the soundproof panel not only has an excellent sound insulation property over a wide frequency range including a low-frequency zone but also has high sound absorption and sound insulation properties to a sound wave with a frequency in a high-frequency zone. Thus, the soundproof panel is suitable for use with a noisy place (for example, a construction site, an arterial road, and an airfield or airport).

DESCRIPTION OF EMBODIMENTS

Figure 1:
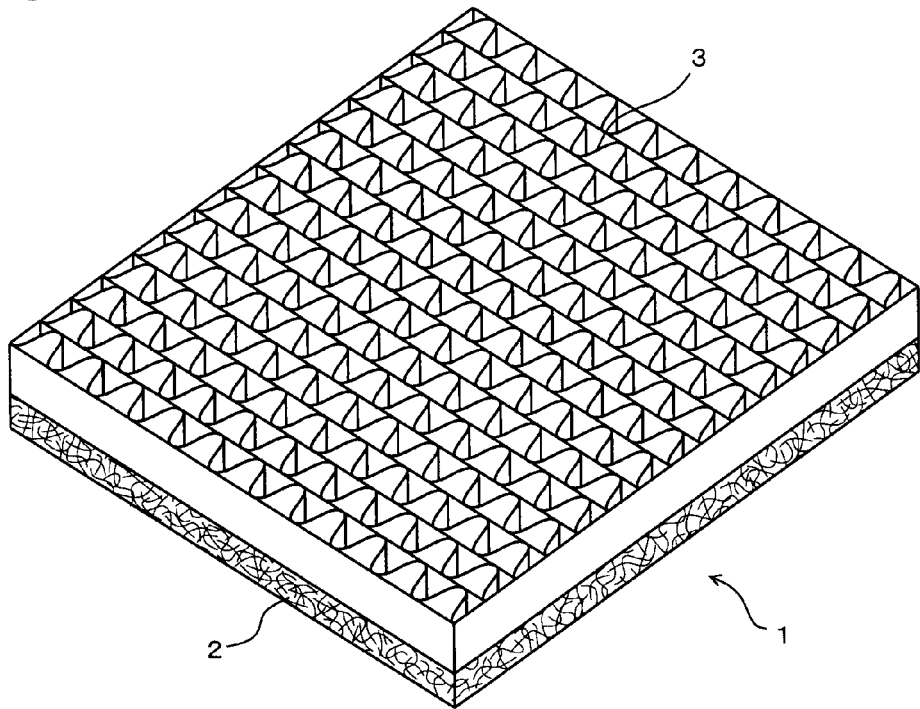
FIG. 1 is a schematic perspective view showing a soundproof panel in accordance with an embodiment of the present invention.

The soundproof panel (sound absorption or sound insulation panel) of the present invention comprises a nonwoven structural member containing a thermal adhesive fiber under moisture, and a board member (a honeycomb member or a surface member).

[Nonwoven Structural Member]

The nonwoven structural member contains a thermal (heat) adhesive fiber under moisture and is a shaped product having a nonwoven structure (nonwoven fiber aggregate structure or nonwoven fabric structure). Further, the nonwoven structural member in the present invention has fibers (or fibers of the structural member) fixed by melting (melt-bonding) of the thermal adhesive fibers under moisture, and the nonwoven structural member has a high sound absorption and adiathermancy and a high shock absorption, which are characteristics of a fiber aggregate structure. In addition, the nonwoven structural member has a specific arrangement (or direction) of the fibers constituting the nonwoven structure and a specific state in which the fibers constituting the nonwoven structural member are bond together, whereby the nonwoven structural member has both bending behavior and lightness in weight, both of which an ordinary nonwoven fabric cannot afford, besides bending endurance, a shape retention property, and air-permeability.

Such a nonwoven structural member is, as described later, obtained by applying a high-temperature (super-heated or heated) water vapor (or steam) on a web comprising the thermal adhesive fiber under moisture to induce the adhesiveness of the thermal adhesive fiber under moisture (or to bring the thermal adhesive fiber under moisture into an adhesive state) at a temperature of not higher than the melting point of the adhesive fiber and bonding the fibers constituting the web partly to each other. That is, the nonwoven structural member is obtained by bonding of mono-fibers and bundles of the aggregated fibers at contact points or areas thereof as if forming a jungle-gym (a three-dimensional crosslinking) of the fibers, under a moist and heat condition or state, to form tiny voids between the fibers.

The thermal adhesive fiber under moisture comprises at least a thermal adhesive resin under moisture. It is sufficient that the thermal adhesive resin under moisture can flow (or melt) or easily deform and exhibit adhesiveness at a temperature reached easily with an aid of a high-temperature water vapor. Specifically, the thermal adhesive resin under moisture may include a thermoplastic resin which softens with (or by) a hot water (e.g., a water having a temperature of about 80 to 120° C. and particularly about 95 to 100° C.) to bond to itself or to other fibers, for example, a vinyl alcohol-series polymer (e.g., an ethylene-vinyl alcohol copolymer), a polylactic acid-series resin (e.g., a polylactic acid), and a (meth)acrylic copolymer containing a (meth)acrylamide unit. Further, the thermal adhesive resin under moisture may also include an elastomer which can easily flow (melt) or deform and exhibit adhesiveness with an aid of a high-temperature water vapor (for example, a polyolefin-series elastomer, a polyester-series elastomer, a polyamide-series elastomer, a polyurethane-series elastomer, and a styrene-series elastomer). These thermal adhesive resins under moisture may be used singly or in combination. Among the thermal adhesive resins under moisture, the particularly preferred one includes a vinyl alcohol-series polymer containing an $\alpha$-$C_{2-10}$olefin unit such as ethylene or propylene, particularly, an ethylene-vinyl alcohol-series copolymer.

The ethylene unit content in the ethylene-vinyl alcohol-series copolymer (the degree of copolymerization) may be, for example, about 5 to 65% by mol (e.g., about 10 to 60 mol %), preferably about 20 to 55 mol %, more preferably about 30 to 50 mol %. The ethylene unit content within the above-mentioned range provides a thermal resin under moisture having a unique behavior. That is, the thermal resin under moisture has thermal adhesiveness under moisture and insolubility in hot water. An ethylene-vinyl alcohol-series copolymer having an excessively small ethylene unit content readily swells or becomes a gel by a water vapor having a low temperature (or by water), whereby the copolymer readily deforms when once getting wet. On the other hand, an ethylene-vinyl alcohol-series copolymer having an excessively large ethylene unit content has a low hygroscopicity. In such a case, it is difficult to allow the copolymer to melt and bond the fibers constituting the nonwoven structural member by an application of moisture and heat, whereby it is difficult to produce a structural member having strength for practical use. The ethylene unit content is, in particular, in the range of 30 to 50 mol % provides a structural member having an excellent processability (or formability) into a sheet or a board (or a plate).

The degree of saponification of vinyl alcohol unit in the ethylene-vinyl alcohol-series copolymer is, for example, about 90 to 99.99 mol %, preferably about 95 to 99.98 mol %, and more preferably about 96 to 99.97 mol %. An excessively small degree of saponification degrades the heat stability of the copolymer to cause a thermal decomposition or a gelation, whereby the stability of the copolymer is deteriorated. On the other hand, an excessively large degree of saponification makes the production of the thermal adhesive fiber under moisture difficult.

The viscosity-average degree of polymerization of the ethylene-vinyl alcohol-series copolymer can be selected according to need, and is for example, about 200 to 2500, preferably about 300 to 2000, and more preferably about 400 to 1500. An ethylene-vinyl alcohol-series copolymer having a viscosity-average degree of polymerization within the above-mentioned range provides a thermal adhesive fiber under moisture having an excellent balance between spinning property and thermal adhesiveness under moisture.

The cross-sectional form of the thermal adhesive fiber under moisture (a form or shape of a cross section perpendicular to the length direction of the fiber) may include not only a common solid-core cross section such as a circular cross section or a deformed (or modified) cross section [e.g., a flat form, an oval (or elliptical) form, and a polygonal form], but also a hollow cross-section. The thermal adhesive fiber under moisture may be a conjugated (or composite) fiber comprising a plurality of resins, at least one of which is the thermal adhesive resin under moisture. The conjugated fiber has the thermal adhesive resin under moisture at least on part or areas of the surface thereof. In order to bond the fibers, it is preferable that the thermal adhesive resin under moisture form a continuous area of the surface of the conjugated fiber in the length direction of the conjugated fiber. The coverage of the thermal adhesive resin under moisture is, for example, not less than 50%, preferably not less than 80%, and more preferably not less than 90% of the surface of the thermal adhesive fiber under moisture.

The cross-sectional structure of the conjugated fiber having the thermal adhesive fiber under moisture on the surface thereof, may include, e.g., a sheath-core form, an islands-in-the-sea form, a side-by-side form or a multi-layer laminated form, a radially-laminated form, and a random composite form. Among these cross-sectional structures, the structure preferred in terms of a high adhesiveness includes a sheath-core form structure in which the entire surface of the fiber is covered with the thermal adhesive resin under moisture (that is, a sheath-core structure in which a sheath part comprises the thermal adhesive resin under moisture). The fiber having a sheath-core structure may be a fiber in which a surface of a fiber comprising a fiber-forming (or fiber-formable) polymer other than the thermal adhesive resin under moisture is coated (or covered) with the thermal adhesive resin under moisture.

The conjugated fiber may comprise a combination of two or more of the thermal adhesive resins under moisture or a combination of the thermal adhesive resin under moisture and a non thermal adhesive resin under moisture. The non thermal adhesive resin under moisture may include a non water-soluble or hydrophobic resin, e.g., a polyolefinic resin, a (meth) acrylic resin, a vinyl chloride-series resin, a styrenic resin, a polyester-series resin, a polyamide-series resin, a polycarbonate-series resin, a polyurethane-series resin, and a thermoplastic elastomer. These non thermal adhesive resins under moisture may be used singly or in combination.

Among these non thermal adhesive resins under moisture, in terms of excellent heat resistance and dimensional stability, the preferred one includes a resin having a melting point higher than that of the thermal adhesive resin under moisture (particularly an ethylene-vinyl alcohol-series copolymer), for example, a polypropylene-series resin, a polyester-series resin, and a polyamide-series resin. In particular, the resin preferred in terms of an excellent balance of properties (e.g., both heat resistance and fiber processability) includes a polyester-series resin or a polyamide-series resin.

The preferred polyester-series resin includes an aromatic polyester-series resin such as a poly$C_{2-4}$alkylene arylate-series resin (e.g., a polyethylene terephthalate (PET), a polytrimethylene terephthalate, a polybutylene terephthalate, and a polyethylene naphthalate), particularly, a polyethylene terephthalate-series resin such as a PET. The polyethylene terephthalate-series resin may contain, in addition to an ethylene terephthalate unit, a unit derived from a dicarboxylic acid other than terephthalic acid or from a diol other than ethylene glycol in the proportion not more than 20 mol %. Incidentally, the above-mentioned dicarboxylic acid or diol may include a dicarboxylic acid (e.g., isophthalic acid, naphthalene-2,6-dicarboxylic aid, phthalic acid, 4,4'-diphenyldicarboxylic acid, bis(carboxyphenyl)ethane, and sodium 5-sulfoisophthalate) and a diol (e.g., diethylene glycol, 1,3-propanediol, 1,4-butanediol, 1,6-hexanediol, neopentyl glycol, cyclohexane-1,4-dimethanol, a polyethylene glycol, and a polytetramethylene glycol).

The preferred polyamide-series resin includes, e.g., an aliphatic polyamide and a copolymer thereof (such as a polyamide 6, a polyamide 66, a polyamide 610, a polyamide 10, a polyamide 12, or a polyamide 6-12) and a semiaromatic polyamide synthesized from an aromatic dicarboxylic acid and an aliphatic diamine. These polyamide-series resins may also contain other copolymerizable units.

The proportion (mass ratio) of the thermal adhesive resin under moisture relative to the non thermal adhesive resin under moisture (a fiber-forming polymer) in the conjugated fiber can be selected according to the structure (e.g., a sheath-core form structure) and is not particularly limited to a specific one as long as the thermal adhesive resin under moisture is present on or forms the surface of the conjugated fiber. For example, the proportion of the thermal adhesive resin under moisture relative to the non thermal adhesive resin under moisture is about 90/10 to 10/90, preferably about 80/20 to 15/85, and more preferably about 60/40 to 20/80. An excessively large proportion of the thermal adhesive resin under moisture does not provide a conjugated fiber having strength. An excessively small proportion of the thermal adhesive resin under moisture makes it difficult to allow the thermal adhesive resin under moisture to be present on the surface of the conjugated fiber continuously in the length direction of the conjugated fiber, which lowers the thermal adhesiveness under moisture of the conjugated fiber. Such a tendency also appears in the conjugated fiber obtained by coating the surface of the non thermal adhesive fiber under moisture with the thermal adhesive resin under moisture.

The average fineness of the thermal adhesive fiber under moisture can be selected, according to the applications, for example, from the range of about 0.01 to 100 dtex, preferably about 0.1 to 50 dtex, and more preferably about 0.5 to 30 dtex (particularly about 1 to 10 dtex). A thermal adhesive fiber under moisture having an average fineness within the above-mentioned range has an excellent balance of strength and thermal adhesiveness under moisture.

The average fiber length of the thermal adhesive fiber under moisture can be selected from, for example, the range of about 10 to 100 mm, preferably about 20 to 80 mm, and more preferably about 25 to 75 mm. A thermal adhesive fiber under moisture having an average fiber length within the above-mentioned range entangles with other fibers enough, whereby the mechanical strength of the nonwoven structural member is improved.

The degree of crimp of the thermal adhesive fiber under moisture is, for example, about 1 to 50%, preferably about 3 to 40%, and more preferably about 5 to 30%. Moreover, the number of crimps is, for example, about 1 to 100 per 25 mm, preferably about 5 to 50 per 25 mm, and more preferably about 10 to 30 per 25 mm.

The nonwoven structural member may further comprise a non thermal adhesive fiber under moisture in addition to the thermal adhesive fiber under moisture. The non thermal adhesive fiber under moisture may include a fiber comprising a non thermal adhesive resin under moisture constituting the conjugated fiber, and further a cellulose-series fiber (e.g., a rayon fiber and an acetate fiber). These non thermal adhesive fibers under moisture may be used singly or in combination. These non thermal adhesive fibers under moisture may be selected according to a required characteristic. Combination of the thermal adhesive fiber under moisture with a semi-synthetic fiber (such as a rayon) can provide a nonwoven structural member having a relatively high density and a high mechanical property.

The proportion (mass ratio) of the thermal adhesive fiber under moisture relative to the non thermal adhesive fiber under moisture [the thermal adhesive fiber under moisture/the non thermal adhesive fiber under moisture] is about 100/0 to 20/80 (e.g., about 99/1 to 20/80), preferably about 100/0 to 50/50 (e.g., about 95/5 to 50/50), more preferably about 100/0 to 70/30, according to the kind or purpose of the panel. An excessively small ratio of the thermal adhesive fiber under moisture degrades the hardness of the nonwoven structural member, whereby the easiness in handling (or easy-to-handle) of the nonwoven structural member is difficult to maintain.

The nonwoven structural member (or fiber) may further contain a conventional additive, for example, a stabilizer (e.g., a heat stabilizer such as a copper compound, an ultraviolet absorber, a light stabilizer, or an antioxidant), a dispersing agent, a thickener or a viscosity controlling agent, a particulate (or fine particle), a coloring agent, an antistatic agent, a flame-retardant, a plasticizer, a lubricant, a crystallization speed retardant, a lubricating agent, an antibacterial agent, an insecticide or acaricide, a fungicide, a delustering agent, a thermal storage medium (or agent), a perfume (or a fragrant material), a fluorescent brightener, and a humectant (or a wetting agent). These additives may be used singly or in combination. The additive may adhere on (or may be supported to) a surface of the structural member or may be contained in the fiber.

Incidentally, adding a flame-retardant to the nonwoven structural member is advantageous when the structural member is used for the application requiring flame retardancy. The flame-retardant which may be used includes a conventional inorganic flame-retardant and organic flame-retardant. A halogen-containing flame retardant and a phosphorus-containing flame retardant, which are in widespread use and have high flame retardancy, may also be used as the flame-retardant for the nonwoven structural member (or fiber). However, the halogen-containing flame retardant and phosphorus-containing flame retardant have the following problems: the incineration of the halogen-containing flame retardant generates a halogen gas, which consequently causes acid rain; and the hydrolysis of the phosphorus-containing flame retardant causes the discharge of phosphorus compounds, which leads to the eutrophication of lakes and marshes. Therefore, in the present invention, a boron-containing flame retardant and/or a silicon-containing flame retardant, which dose not cause such problems, is preferably used to impart a high flame retardancy to the nonwoven structural member.

The boron-containing flame retardant may include, for example, a boric acid (e.g., orthoboric acid and metaboric acid), a salt of a boric acid [e.g., a salt of a boric acid and an alkali metal such as sodium tetraborate, a salt of a boric acid and an alkaline earth metal such as barium metaborate, and a salt of a boric acid and a transition metal such as zinc borate], and a condensed boric acid (or a salt thereof) (e.g., pyroboric acid, tetraboric acid, pentaboric acid, octaboric acid, and a metal salt thereof). These boron-containing flame retardants may be a hydrate compound (e.g., a borax such as sodium tetraborate hydrate). These boron-containing flame retardants may be used singly or in combination.

The silicon-containing flame retardant may include, for example, a silicone compound such as a polyorganosiloxane, a silicon oxide such as a silica or a colloidal silica, and a metal silicate such as calcium silicate, aluminum silicate, magnesium silicate, or magnesium aluminosilicate.

These flame-retardants may be used singly or in combination. Among these flame-retardants, the boron-containing flame retardant such as a boric acid or a borax is preferably used as a main component. In particular, the boric acid and the borax are preferably used in combination. The proportion (mass ratio) of the both components (the boric acid/the borax) is about 90/10 to 10/90 and preferably about 60/40 to 30/70. The boric acid and the borax may be used in the form of an aqueous solution for a process for imparting flame retardancy to the structural member. For example, about 10 to 35 parts by mass of the boric acid and about 15 to 45 parts by mass of the borax may be added to 100 parts by mass of water and dissolved in the water to prepare an aqueous solution.

The proportion of the flame-retardant is selected according to the applications of the nonwoven structural member. The proportion of the flame-retardant in the whole mass of the nonwoven structural member is, for example, about 1 to 300% by mass, preferably about 5 to 200% by mass, and more preferably about 10 to 150% by mass.

The process for imparting flame retardancy to the nonwoven structural member may include a process, like a conventional dip-nip process, comprising impregnating or spraying the nonwoven structural member with an aqueous solution or emulsion containing the flame-retardant and drying the obtained structural member, a process comprising kneading the resin and the flame-retardant by a biaxial extruder to extrude a fiber, spinning the obtained fiber, and using the obtained fiber to produce the structural member, or the like.

[Properties of Nonwoven Structural Member]

In order to produce the nonwoven structural member having an excellent balance of sound absorption property and lightness in weight (low density) together with a high hardness (form or configuration stability), it is necessary to adjust the arrangement and bonding state of the fiber constituting a web of the above-mentioned nonwoven fiber moderately. That is, it is preferable that the fibers constituting the fiber web be distributed or arranged to cross each other and melt-bonded at each intersection point thereof with putting the fiber length direction in a direction approximately parallel to the surface of the fiber web (nonwoven fiber). In particular, in the nonwoven structural member requiring a high form or configuration stability, a few or tens of the fibers approximately parallel to each other may be melt-bonded to form a melt-bonded bundle of the fibers in addition to the fibers melt-bonded at the intersection points thereof. The formation of the melt-bond of the fibers at spaced and discrete distance (such as the melt-bond of the mono-fibers at the intersection points thereof, the melt-bond of the melt-bonded bundles of the fibers, or the melt-bond of the mono-fiber to the melt-bonded bundles of the fibers) leads to a structure which is like a jungle-gym (or a three-dimensional crosslinking) of the fibers, thereby providing a nonwoven structural member having a desired bending behavior and hardness of the compression. Such a structure is a net-like structure in which the fibers (e.g., the mono-fibers, the melt-bonded bundle of the fibers, and a combination thereof) are bonded at the intersection points thereof or a structure in which the fibers are bonded at the intersection points to fix the other fibers adjacent thereto on the fibers. According to the present invention, a preferred mode of the nonwoven structural member is an approximately uniform distribution of the structure in the direction parallel to the surface of the fiber web (surface direction) and in the thickness direction of the fiber web. According to the present invention, since the fibers are held in the structure vibratable, the nonwoven structural member has an excellent sound absorption property and also has excellent mechanical properties due to melt-bonding at the intersection points thereof.

The term "(the fiber) being distributed or arranged to cross each other with putting the fiber length direction in a direction approximately parallel to the surface of the fiber web" means a state of the fibers in the fiber web which is free from the high frequent distribution of part or area having a large number of the fibers with being the fiber length direction parallel to the thickness direction. More specifically, based on the observation of any area of the cross section of the fiber web of the structural member by a microscope, the presence rate (the proportion of the number of fibers) of the fiber whose fiber length direction is approximately parallel to the thickness direction without bending or break, is not more than 10% (particularly not more than 5%) relative to the total number of the fibers in the cross section. Incidentally, in the observation, such a fiber has a length of not less than 30% of the thickness of the fiber web, across the cross section.

Moreover, in the nonwoven structural member, the bonded fiber ratio of the fibers of the nonwoven structure by melt-bonding of the thermal adhesive fiber under moisture is about 3 to 85% (e.g., about 5 to 60%), preferably about to 50% (e.g., about 6 to 40%), and more preferably about 6 to 35% (particularly about 10 to 35%). According to the present invention, since the fibers are bonded in such a range, each fiber has a high degree of freedom. Thus the nonwoven structural member achieves a high sound absorption property. Further, when the soundproof panel is used for the application which requires some strength, the bonded fiber ratio may be, for example, about 10 to 85%, preferably about 20 to 80%, and more preferably about 30 to 75%.

The bonded fiber ratio in the present invention can be determined by a method in Examples described later. The bonded fiber ratio means the proportion of the number of the cross sections of two or more fibers bonded relative to the total number of the cross sections of fibers in the cross section of the nonwoven structure. Accordingly, the low bonded fiber ratio means a low proportion of the melt-bond of a plurality of fibers (or a low proportion of the fibers melt-bonded to form bundles).

Moreover, in the present invention, the fibers constituting the nonwoven structure are bonded at the intersection points thereof. In order to produce a nonwoven structural member having a high bending stress with the number of bonded points as less as possible, it is preferable that the bonded points uniformly distribute from the surface of the nonwoven structural member, via inside (middle), to the backside of the nonwoven structural member in the thickness direction. A concentration of the bonded points in the surface or inside not only tends to fail to provide a nonwoven structural member having an excellent mechanical properties and formability but also lowers the form stability at a part having a small number of the bonded points.

Accordingly, it is preferable that the bonded fiber ratio in each of three areas in the cross section of the nonwoven structural member be within the above-mentioned range. The above-mentioned three areas are obtained by cutting the nonwoven structural member across the thickness direction and dividing the obtained cross section equally into three in a direction perpendicular to the thickness direction. In addition, the ratio of the minimum of the bonded fiber ratio relative to the maximum thereof in the three areas (the minimum/the maximum) (the ratio of the minimum bonded fiber ratio relative to the maximum bonded fiber ratio among the three areas) is, for example, not less than 50% (e.g., about 50 to 100%), preferably about 55 to 99%, and more preferably about 60 to 98% (particularly about 70 to 97%). Owing to such a uniform distribution of the bonded fiber ratio in the thickness direction, the nonwoven structural member of the present invention has an excellent hardness or bending strength, folding endurance or toughness in spite of a small bonded area of the fiber. Further, due to the small bonded area of the fiber, there are many freely vibratable fibers, and the nonwoven structural member has an excellent vibrational absorption. Thus, a sound wave passed through the board member (the surface member or the honeycomb member) is absorbed by the nonwoven structural member, and the solid-borne sound can be reduced. That is, the nonwoven structural member in the present invention has both an adequate mechanical property for a board and an adequate sound absorption property for a nonwoven structural member.

The bonded fiber ratio can easily be determined by the following manner: taking a macrophotography of the cross section of the nonwoven structural member by using a scanning electron microscope (SEM); and counting the number of the cross section of the melt-bonded fibers in a predetermined area of the macrophotograph. However, for a melt-bonded bundle of the fibers, since the fibers form a bundle with each other or intersect with each other, the observation (or counting) of individual fibers (or the observation (or counting) of the single fiber) tends to be difficult, particularly in the dense aggregation of the fibers. In this case, the determination of the bonded fiber ratio is as follows, which is obtained by bonding the fibers with a sheath-core form conjugated fiber comprising a sheath part comprising the thermal adhesive fiber under moisture and a core part comprising a fiber-formable polymer: observing the cross section of the nonwoven structural member; loosing the melt-bonded fibers by a mean such as melting or washing out (or off) the thermal adhesive fiber under moisture; observing the cross section again; and comparing the observations with each other.

One of the features of the nonwoven structural member is that the nonwoven structural member has high toughness and bending stress and exhibits an excellent bending behavior. In the present invention, in accordance with JIS K7017 "fiber— reinforced plastic composites—determination of flexural properties", a sample is gradually bent to measure a generated repulsive (repelling) power thereof, and let the obtained maximum stress (peak stress) be the bending stress, which is used as an index representing the bending behavior. That is, the greater bending stress the structural member has, the harder structural member is. Furthermore, the greater the bending deflection (bending displacement) to break the measuring object is required, the more flexible the structural member is.

The maximum bending stress of the nonwoven structural member is not less than 0.05 MPa in at least one direction (preferably, in all directions). The maximum bending stress may preferably be about 0.1 to 30 MPa and more preferably about 0.15 to 20 MPa (particularly 0.2 to 10 MPa). A nonwoven structural member having an excessively small maximum bending stress readily breaks by its own weight or by only a slight amount of the load applied thereon when the member is used as a board member. Moreover, a nonwoven structural member having an excessively large maximum bending stress is very hard. Such a member readily breaks when the member is kept bending even after exceeding the peak of the stress.

The correlation between the bending deflection and the bending stress generated by the bending deflection is as follows: at first, the stress is increased as the bending deflection is increased (e.g., an increase in the stress is an approximately linear); and in the nonwoven structural member in the present invention, the stress starts to decrease gradually after the bending deflection of a measuring sample is increased and reaches its specific bending deflection. That is, the graph obtained by plotting the bending deflection and the stress shows a correlation describing a convex parabola. The nonwoven structural member in the present invention does not show an abrupt decrease in the stress when the nonwoven structural member is kept bending even after exceeding the maximum bending stress (the peak of the bending stress). In other words, the nonwoven structural member shows "tenacity (or toughness)", which is also one of features of the nonwoven structural member in the present invention. In the present invention, such a "tenacity" is represented by an index which uses a bending stress remaining at a bending deflection after exceeding a bending deflection at the peak bending stress. That is, the nonwoven structural member in the present invention may maintain at least a stress of not less than 1/10 [preferably not less than 3/10 (e.g., about 3/10 to 1), and more preferably not less than 5/10 (e.g., about 5/10 to 9/10)] of the maximum bending stress (peak stress value) at 1.5 times as large as the bending deflection at the maximum bending stress (hereinafter, sometimes referred as to "stress at 1.5 times bending deflection").

The nonwoven structural member has a high lightness in weight owing to the voids formed between the fibers. Moreover, since these voids are not closed individually but linked continuously, the nonwoven structural member has a high air-permeability. Such a structure of the nonwoven structural member is difficult for a conventional hardening process to form, such as a resin impregnation process or a process for forming a film-like structure by bonding fibers in a surface part firmly.

That is, the nonwoven structural member has a low density, specifically, the apparent density of the nonwoven structural member is, for example, about 0.03 to 0.7 g/cm$^3$, preferably about 0.035 to 0.4 g/cm$^3$, and more preferably about 0.04 to 0.35 g/cm$^3$. An excessively low apparent density provides a nonwoven structural member having a high sound absorption property and lightness in weight, whereby the bending hardness of the nonwoven structural member is decreased. On the other hand, an excessively high apparent density provides a nonwoven structural member having hardness, whereby the nonwoven structural member deteriorates in sound absorption property and lightness in weight.

The apparent density may be selected according to the structure or application of the soundproof panel. When the nonwoven structural member is used in combination with a honeycomb member, the apparent density of the nonwoven structural member may be, for example, about 0.05 to 0.7 g/cm$^3$, preferably about 0.08 to 0.4 g/cm$^3$, and more preferably about 0.1 to 0.35 g/cm$^3$.

Moreover, when the nonwoven structural member is in a board form and is a panel having an excellent translucency, the apparent density of the nonwoven structural member may be, for example, about 0.03 to 0.08 g/cm$^3$, preferably about 0.032 to 0.07 g/cm$^3$, and more preferably about 0.035 to 0.06 g/cm$^3$ (particularly, about 0.035 to 0.05 g/cm$^3$). According to the present invention, even when the nonwoven structural member has such a low density, the nonwoven structural member expresses an excellent sound insulation property and has a high strength. Thus, the present invention can provide a novel soundproof panel (sound insulation panel), which is thin and lightweight and does not require a conventional rail member (a rail member composed of a non-fiber material).

Further, when the soundproof panel is used for an application which does not require translucency or used as a rail member, the apparent density of the nonwoven structural member may be selected from the range of about 0.03 to 0.5 g/cm$^3$ (e.g., about 0.04 to 0.5 g/cm$^3$) and may be, for example, about 0.05 to 0.5 g/cm$^3$ (e.g., about 0.06 to 0.5 g/cm$^3$), preferably about 0.07 to 0.3 g/cm$^3$, and more preferably about 0.08 to 0.2 g/cm$^3$.

The basis weight of the nonwoven structural member can be selected from the range, for example, about 50 to 10000 g/m$^2$, and is preferably about 100 to 8000 g/m$^2$ (e.g., about 150 to 8000 g/m$^2$), and more preferably about 200 to 6000 g/m$^2$ (e.g., about 300 to 6000 g/m$^2$). A nonwoven structural member having an excessively small basis weight has a difficulty in the maintenance of hardness. On the other hand, an excessively large basis weight significantly increases the thickness of the web. In a moist-thermal (heat) process, a high-temperature water vapor fails to enter the inside of the web having an excessively large basis weight, and it is difficult to form a structural member having a uniform distribution of the melt-bond of the fibers in the thickness direction.

Further, the basis weight can also be selected according to the structure or application of the soundproof panel. When the nonwoven structural member is in a board form and is a panel having an excellent translucency, the basis weight of the nonwoven structural member may be, for example, about 100 to 1000 g/m$^2$, preferably about 150 to 800 g/m$^2$, and more preferably about 200 to 500 g/m$^2$. Furthermore, when the soundproof panel is used for an application which does not require translucency or used as a rail member, the basis weight of the nonwoven structural member may be, for example, about 300 to 5000 g/m$^2$, preferably about 500 to 3000 g/m$^2$, and more preferably about 600 to 1000 g/m$^2$.

The nonwoven structural member also has an excellent translucency. In particular, the nonwoven structural member can also achieve a high translucency by regulating (or adjusting) the density or the basis weight. Further, the nonwoven structural member in the present invention has not only an excellent translucency but also an excellent diffusibility of a transmitted light. Specifically, when a light enters vertically with respect to a first surface of the nonwoven structural member and is transmitted from a second surface thereof, the ratio of a transmitted light strength in a 45° direction with respect to a normal line of the second surface (a transmitted light strength at an angle of 45° to the normal line) relative to a transmitted light strength in a direction parallel to the normal line (a transmitted light strength at an angle of 0° to the normal line) [45° transmitted light strength/parallel transmitted light strength] is not less than 50% (e.g., about 50 to 85%), preferably about 55 to 85%, and more preferably about 60 to 80%. That is, since the nonwoven structural member has a diffusibility of a transmitted light, use of the nonwoven structural member as a wall or the like of an architectural structure achieves a uniform brightness in the room and softens sunlight shone into the room or lighting (or illumination).

The thickness of the nonwoven structural member is not particularly limited to a specific one and may be selected from the range of about 1 to 100 mm. For example, the thickness is, for example, about 3 to 50 mm, preferably about 5 to 45 mm (particularly about 10 to 35 mm). When the nonwoven structural member is in a board or sheet form, the thickness thereof may be about 5 to 30 mm. A nonwoven structural member having an excessively small thickness has a lowered sound absorption property and has a difficulty in the maintenance of the hardness. On the other hand, a nonwoven structural member having an excessively large thickness is heavy and hard to handle.

Further, in order to improve the lightness in weight, the thickness of a nonwoven structural member having a rather low density (e.g., about 0.035 to 0.045 g/cm$^3$) is regulated (or controlled) to about 10 to 60 mm, preferably about 20 to 50 mm, and more preferably about 30 to 45 mm, and a light-weight panel having an excellent sound insulation property can be prepared.

Further, the nonwoven structural member in the present invention has an excellent air-permeability due to the non-woven structure thereof. When a surface member is adhered (or bonded) to the nonwoven structural member or when a decorated film is adhered (or laminated) to the nonwoven structural member to provide a board member, air between the structural member and the surface member or decorated film can pass through the structural member to avoid detachment or separation of the surface member or film after adhesion. Moreover, since the adhesive used for the adhesion of the surface member or film is attached (or bonded) to the fibers existing in the surface of the structural member and enters the space between the fibers to serve as a wedge, firm adhesion of the nonwoven structural member to the surface member or film can be achieved. Further, use of such a panel or board allows internal and external air of the panel or board to be exchanged and may be of use for not only an application requiring a sound absorption property but also a transportation container or the like requiring air-permeability.

Specifically, the air-permeability of the nonwoven structural member measured by a Fragzier tester method is not less than 0.1 cm$^3$/(cm$^2$·second) [e.g., about 0.1 to 300 Cm$^3$/(cm$^2$·second)], preferably about 1 to 250 cm$^3$/(cm$^2$·second), and more preferably about 5 to 200 cm$^3$/(cm$^2$·second). An excessively small air-permeability does not allow air to pass through the nonwoven structural member spontaneously, whereby an external pressure is needed to pass air therethrough. On the other hand, a nonwoven structural member having an excessively large air-permeability has large voids. Such a structural member has a higher air-permeability but a sound absorption property and a low bending stress due to the large voids.

Further, as described above, owing to the fiber-bonded points uniformly distributed in the thickness direction, the nonwoven structural member in the present invention also has an excellent shape retention property. That is, although the ordinary nonwoven structural member can secure required bending hardness by a binder or others, the fibers are essentially less bonded to each other. Thus, for example, when the ordinary nonwoven structural member is cut into a small piece having about 5 mm square, the fibers constituting the structural member are separated from the structural member by a slight external force and finally segmentalized into every fiber. In contrast, in the nonwoven structural member in the present invention, the fibers are uniformly bonded to each other at a close distance. Thus, even when the nonwoven structural member is cut into a small piece, the nonwoven structural member can sufficiently retain the form or configuration thereof without segmentalization of the fibers into every fiber unit. This also means that dust generation due to peeling (or falling) off the fibers is less induced by cutting of the structural member.

[Production Process of Nonwoven Structural Member]

In the process for producing the nonwoven structural member, firstly, a web is formed from the fiber comprising the thermal adhesive fiber under moisture. The web-forming process which may be used includes a conventional process, e.g., a direct process such as a span bond process or a melt-blow process, a carding process using a melt-blow fiber or a staple fiber, and a dry process such as air-laid process. Among these processes, a carding process using a melt-blow fiber or a staple fiber, particularly, a carding process using a staple fiber is commonly used. The web obtained by using the staple fiber may include, e.g., a random web, a semi-random web, a parallel web, and a cross-wrap web. Among these webs, a semi-random web or a parallel web is preferable to increase the proportion of the melt-bonded bundle of the fibers of the web.

The obtained fiber web is then conveyed (or carried) to the next step by a belt conveyor and is exposed to a flow of a superheated water vapor or a high-temperature vapor (a high-pressure steam) to produce a structural member having a nonwoven structure. That is, while the fiber web on the conveyer is passing through a flow of a high-speed and high-temperature water vapor sprayed (or applied) from a nozzle of the vapor spraying apparatus, the fibers of the web are bonded three-dimensionally by the high-temperature water vapor sprayed thereto. In particular, the fiber web in the present invention has air-permeability, which allows the high-temperature water vapor to infiltrate (penetrate) into the fiber web, and a structural member having almost uniform melt-bonded state can be obtained.

Specifically, the nonwoven structural member is obtained by spraying a high-temperature water vapor having a temperature of about 70 to 150° C., preferably about 80 to 120° C., and more preferably about 90 to 110° C. on the fiber web at a pressure of about 0.1 to 2 MPa, preferably about 0.2 to 1.5 MPa, and more preferably about 0.3 to 1 MPa and a treatment (or processing) speed of about not more than 200 m/minute, preferably about 0.1 to 100 m/minute, and more preferably about 1 to 50 m/minute. The detailed production process may be referred to a production process described in International Publication No. WO2007/116676 (Patent Document 3).

The nonwoven structural member is usually obtained as a shaped product having a board or sheet form (or shape) and subjected to a machinery cut. If necessary, the nonwoven structural member may be subjected to a secondary molding by a conventional thermoforming. The thermoforming to be used may include, e.g., a compression molding or forming, a pressure forming (e.g., an extrusion-pressure forming, a hot-plate pressure forming, a vacuum and pressure forming), a free blowing, a vacuum molding or forming, a bending, a matched-mold forming, a hot-plate molding, and a thermally press molding under moisture.

The nonwoven structural member (shaped product) has a nonwoven structure obtained from a web comprising the fiber, and the form (or shape) thereof may be selected according to the application. The structural member may have a circular cross section, an oval (or elliptical) cross section, or a polygonal cross section, and is usually in a sheet or board form. For use of the structural member as a rail member, the structural member is not particularly limited to specific one as long as the structural member has a shape having two planer surfaces facing each other. Such a shape may include, for example, a square pole and a cylinder or column. The rail member may easily be produced by cutting or hollow-out-processing a sheet-like structural object. In particular, for a combination of a nonwoven structural member having a square pole shape or the like as a rail member with a surface member as a board member, the resulting panel has an excellent lightness in weight and expresses sound absorption and sound insulation properties at a wide range of frequencies, particularly expresses high sound absorption and sound insulation properties to a sound wave having a frequency in a high-frequency zone. Thus, the panel is also preferably used in a place where loud noise or metallic sound (or metallic noise) or others is generated.

[Board Member]

According to the present invention, layer stack (or lamination) of the nonwoven structural member and a board member can improve a sound absorption property and a sound insulation property. It is sufficient that the board member is in a board or sheet form, and the internal structure thereof is not particularly limited to a specific one. The board member may be a hollow-sheet-like structural member, which has an internal cavity (or space), or a solid-sheet-like structural member, which has no internal cavity. In the present invention, a honeycomb member is used as the hollow-sheet-like structural member, and a surface member is used as the solid-sheet-like structural member.

(Honeycomb Member)

The honeycomb member is not particularly limited to a specific one as long as the honeycomb member has spaces derived from a cellular structure thereof. The honeycomb member is usually a board structural member which has net-like (or reticulated) or lattice structure having a plurality of cells independently of each other formed by a plurality of thin or narrow sheets or a continuous thin or narrow sheet.

As the material of the honeycomb member, from the viewpoint of the weight saving of the structural member, a material having a small specific gravity, for example, a paper, a synthetic resin, and a lightweight metal material may be used. Among these materials, a paper is preferred in view of lightness in weight and low price. For example, a base board for corrugated fiberboard, a pasteboard for paper container, and a paper for printing or information may be utilized as the paper. For the application requiring flame retardancy, the particularly suitable paper includes a paper impregnated with aluminum hydroxide or others for flame-retardant treatment, a paper having a metal foil (such as an aluminum foil) laminated thereon, and others.

In order to secure a lightness in weight and a large space in the cell as well as secure a sufficient strength for a soundproof panel, the thickness of the thin sheet forming the honeycomb member is, for example, about 0.01 to 5 mm, preferably about 0.02 to 3 mm, more preferably about 0.03 to 2 mm (particularly about 0.05 to 1.5 mm).

The form or shape (or two-dimensional form) of the cell forming the honeycomb structure is not particularly limited to a honeycomb form (hexagonal form) and may be a triangular form, a lattice form (a quadrilateral form such as a square form, a rectangular form, a rhombic form, or a parallelogram form), a pentagonal form, a wave form, and others. The wave form may be a form in which a wave-form (or corrugated) sheet is interposed between flat (or plate) sheets parallel with each other and is in contact with (or bonded to) the flat sheets at each peak of the wave-form sheet (a form in which a flat sheet and a wave-form sheet are laminated alternately), or a form in which a plurality of wave-form sheets interposed between two flat sheets parallel with each other are in contact with (or bonded to) each other at each peak thereof.

In order to achieve well-balanced sound absorption range, sound absorption property, strength, and others, the average diameter of each cell is, for example, about 1 to 100 mm, preferably about 3 to 80 mm, and more preferably about 5 to 60 mm (particularly about 10 to 50 mm), and may be about 5 to 30 mm. For example, according to the application, a honeycomb member having a general-purpose cell size (e.g., a cell diameter of 5 mm, 10 mm, 20 mm, or 30 mm) may be used. Incidentally, the average diameter of the cell in the present invention is determined according to the form or shape and means the average value of a longer diameter and a shorter diameter for an anisotropic shape. Specifically, for an equilateral hexagon, the shortest distance between two sides facing each other is regarded as the average diameter; for a square, the length of each side is directly regarded as the average diameter; for a rectangle, the average value of a longer side and a shorter side is regarded as the average diameter; and for a wave form, the average value of a peak height of wave (a distance between a maximum peak and a minimum peak) and a distance between a peak and the next peak is regarded as the average diameter.

In view of well-balanced sound absorption property or strength, the thickness of the honeycomb member (the height of the cell) is, for example, about 5 to 200 mm, preferably about 10 to 150 mm, and more preferably about 20 to 100 mm (particularly about 30 to 80 mm). In the present invention, increase in the thickness of the honeycomb member allows the internal volume (inner volume) of the cell to be effectively increased, thereby improving the sound absorption efficiency (particularly, low-frequency sound absorption efficiency).

Examples of a commercially available honeycomb member to be used may include "NEW DICE CORE", "E-STAGE CORE SERIES", "HONEYCOMB CORE SERIES", "ALUMINUM HYDROXIDE CORE", and "NB CORE", each of which is manufactured by Nagoya Sinzai Kogyo Co., Ltd.

(Surface Member)

As the surface member, various inorganic surface members and organic surface members may be used. The inorganic surface member may include, for example, a gypsum board, a calcium silicate board (or plate), a glass board (or plate), and a metal board (or plate) (e.g., an aluminum board, a stainless steel board, and a steel board). The organic surface member may include, for example, a wood board [e.g., a solid wood (or natural wood), a plywood or veneer board (a laminated wood board), and a wood fiber board (MDF)] and a synthetic resin board (or plate) [e.g., a polyethylene board, a polypropylene board, a polystyrene board, a polyvinyl chloride resin board (a vinyl chloride resin board), a poly(methyl methacrylate) board (an acrylic resin board), a polyester board, a polycarbonate resin board, and a polyamide resin board]. Further, the surface member may be a composite or laminated surface member of an inorganic material and an organic material [such as a polyvinyl chloride-steel board (a metal board coated (or covered) with a polyvinyl chloride)]. These surface members may be selected according to the application. For example, for an application requiring an excellent lightness in weight, the preferable surface member includes a wood board (such as a plywood or an MDF), a lightweight metal board (e.g., an aluminum board), and others; and for an application requiring translucency, the preferable surface member includes a transparent resin board (such as an acrylic resin board, a polycarbonate resin board, or a transparent vinyl chloride resin board), a glass board, and others. Moreover, for combination use of a first surface member and a second surface member, the first and second surface members may be the same surface member or different in their kinds. For example, a metal board or a plywood may be used as one surface member to impart a function like a reflector to the soundproof panel.

The plane size of the surface member is not particularly limited to a specific one and may suitably be selected from the range of about 100 mm to 10 m according to a required soundproof panel. For building application, a surface member having a plane size of, for example, 910 mm×1820 mm or 1000 mm×2000 mm, is practically used.

The thickness of the surface member may also be selected from the range of about 0.1 to 100 mm according to the application and material. In order to combine the lightness in weight and the sound insulation property, the thickness of the surface member is, for example, about 0.5 to 50 mm, preferably about 1 to 30 mm, and more preferably about 2 to 20 mm (particularly about 3 to 10 mm). The present invention can achieve a high sound insulation property even when the thickness is as small as several millimeters. In particular, for an application requiring the small thickness and the lightness in weight, the thickness of a surface member comprising the synthetic resin board (or plate) or others may be, for example, about 0.5 to 5 mm, preferably about 1 to 4 mm, and more preferably about 1.5 to 3 mm. In the present invention, even use of such a thin surface member can also achieve a high sound insulation property. Incidentally, the first and second surface members may be different in thickness from each other or may have the same thickness.

Incidentally, surface members having various thicknesses are commercially available. For example, for a gypsum board, standardized products, each having a thickness such as 9.5 mm, 12 mm, 15 mm, and 21 mm, are commercially available; and an acrylic resin board is commercially available in units of 1 mm. Thus, in order to achieve a desired sound insulation property, commercially available surface members may be laminated (or stacked). In particular, a drop of sound insulation performance due to a coincidence effect observed in a single-layer panel may be alleviated by selecting the thickness or combining surface members different in kind.

[Soundproof Panel]

The soundproof panel (structural panel) of the present invention comprises the above-mentioned nonwoven structural member and the above-mentioned board member stacked (or laminated) thereto. The stacked (or laminated) structure may be selected according to the species of the board member.

(Stacked Structure with Honeycomb Member)

FIG. 1 is a schematic perspective view showing an embodiment of a soundproof panel comprising the honeycomb member. A soundproof panel 1 is a soundproof panel comprising a nonwoven structural member 2 and a paper honeycomb member 3 having wave-form cells, which is stacked (or layered) to the nonwoven structural member 2. The nonwoven structural member 2 and the paper honeycomb member 3 are joined (or coupled or bonded) together at contact areas or regions of these structural members with an adhesive (e.g., a polyvinyl acetate-series adhesive). In paper honeycomb member 3, a wave-form sheet (thin sheet) and a flat sheet (thin sheet) are stacked (or arrayed or laminated) alternately to form a honeycomb structure.

Figure 2:
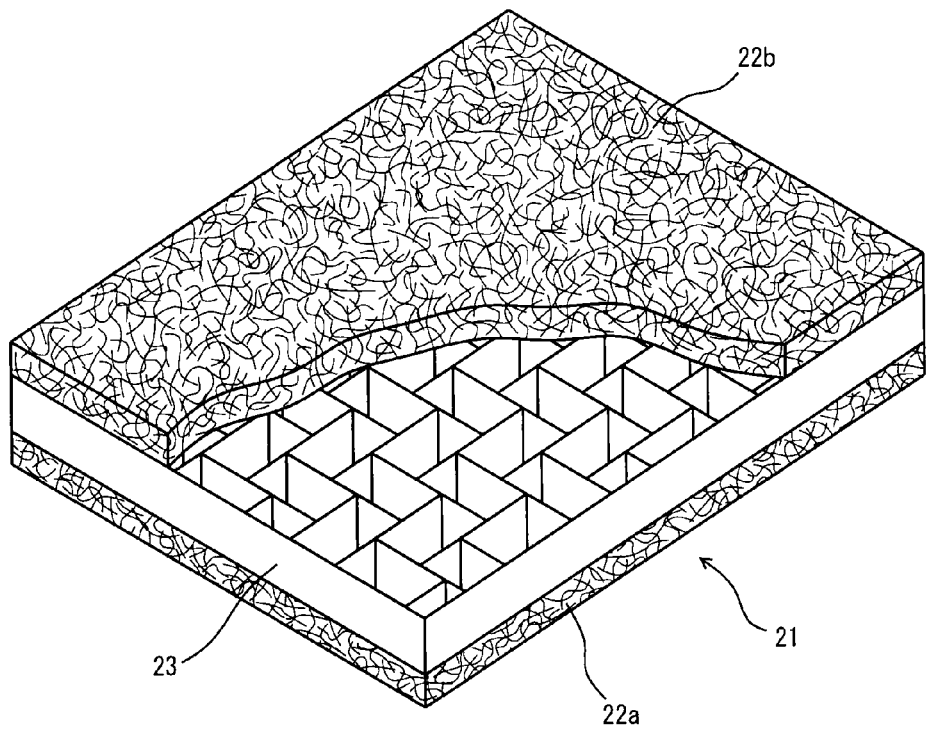
FIG. 2 is a partly broken schematic perspective view showing a soundproof panel in accordance with another embodiment of the present invention.

Moreover, as a stacking (or lamination) manner of the nonwoven structural member and the honeycomb member, a first nonwoven structural member may be stacked to a first side of the honeycomb member and a second nonwoven structural member may be stacked to a second side of the honeycomb member. FIG. 2 is a partly broken schematic perspective view showing a soundproof panel in accordance with another embodiment of the present invention. A soundproof panel 21 is a soundproof panel provided with a paper honeycomb member 23 having a rectangular cell form and nonwoven structural members 22a and 22b stacked to first and second sides of the paper honeycomb member 23, respectively. The nonwoven structural members 22a and 22b are joined to the paper honeycomb member 23 at contact regions of these structural members with an adhesive (e.g., a polyvinyl acetate-series adhesive). According to the present invention, a panel which comprises the honeycomb member, the first nonwoven structural member stacked to a first side of the honeycomb member, and the second nonwoven structural member stacked to a second side of the honeycomb member can achieve a further improved sound absorption effect, particularly a wider sound absorption zone, compared with a panel which comprises the honeycomb member and the nonwoven structural member stacked to only single side of the honeycomb member.

In the soundproof panel provided with the honeycomb member, the thickness ratio of the nonwoven structural member relative to the honeycomb member (when the honeycomb member has first and second nonwoven structural members stacked to first and second sides thereof, respectively, the thickness of the nonwoven structural member stacked to one side of the honeycomb member is regarded as the thickness of the nonwoven structural member) [the nonwoven structural member/the honeycomb member] is, for example, about 1/1 to 1/10, preferably about 1/2 to 1/9, and more preferably about 1/3 to 1/8 (particularly about 1/4 to 1/7). A larger thickness ratio of the honeycomb member allows improvement of the sound absorption property at a low-frequency zone. Further, stacking of the first and second nonwoven structural members to the first and second sides of the honeycomb member, respectively, can achieve well-balanced sound absorption property.

Furthermore, if necessary, the soundproof panel provided with the honeycomb member may further comprise a reflector, a covering member (or a finishing member or an outermost member), and others, as a stacking (or laminating) member. In particular, for the soundproof panel provided with the honeycomb member, the nonwoven structural member may be stacked to a first side of the honeycomb member, and a reflector may be stacked to a second side of the honeycomb member. Specifically, an embodiment in which the first and second sides of the honeycomb member are covered (or coated) with a surface member may include, for example, the following combinations:

Nonwoven structural member/Honeycomb member/Nonwoven structural member

Covering member/Nonwoven structural member/Honeycomb member/Nonwoven structural member/Covering member Covering member/Nonwoven structural member/Honeycomb member/Reflector In the stacked product, the reflector is not particularly limited to a specific one as long as the material for the reflector has a reflection effect of sound waves. In view of the lightness in weight, for example, a polyvinyl chloride-steel board (a metal board coated with a polyvinyl chloride), a plywood (a laminated wood board), a synthetic resin board, an inorganic fiber nonwoven fabric, and others are widely used. The thickness of the reflector is, for example, about 0.01 to 10 mm, preferably about 0.02 to 5 mm, and more preferably about 0.03 to 3 mm. According to the present invention, the reflector produces a moderate sound reflection in addition to the sound absorption or sound insulation effect, and the soundproof panel provided with the reflector may also be used for an application requiring high-level room acoustics such as a concert hall.

As the covering member, a conventional covering member may be used. For example, a cloth, a wood covering member, a film, a paper, and others are available. Further, for decoration of the soundproof panel, a decorated (or face) cloth having an air-permeability, and others are preferably used. The thickness of the covering member is, for example, about 0.1 to 5 mm, preferably about 0.3 to 3 mm, and more preferably about 0.5 to 2 mm.

Further, in order to improve the flame retardancy of the soundproof panel, the soundproof panel may comprise an inorganic fiber nonwoven fabric (such as a glass fiber nonwoven fabric or a carbon fiber nonwoven fabric) as a stacking (or laminating) member.

Since a face member (e.g., a shaped product) is adhered (or bonded) to the honeycomb member, the soundproof panel has an appropriate mechanical strength (e.g., a compressive strength and a bending strength) as an interior material for building. Thus, the thickness of the face member may be not more than about several millimeters, and a lightweight soundproof panel can be produced at a low cost (or economically).

The soundproof panel provided with the honeycomb member has excellent features, including not only being lightweight and low in cost but also maintaining a good air-permeability derived from the nonwoven structure. Further, since the soundproof panel has sound absorption and sound insulation properties, the panel can reduce a reverberant sound and be also used in combination with a reflector for acoustical equipment.

(Stacking Structure with Surface Member)

The soundproof panel (sound insulation panel) provided with the surface member may be a stacked product comprising a surface member and a board-like (or board-shaped) nonwoven structural member stacked to a first side of the surface member. In view of the sound insulation property or versatility, the preferred panel is a panel having a double-wall structure in which a first surface member and a second surface member are stacked (or layered) through a nonwoven structural member.

The panel having a double-wall structure may include, for example, a panel comprising a board-like (or board-shaped) nonwoven structural member, a first surface member stacked to a first side of the nonwoven structural member, and a second surface member stacked to a second side of the nonwoven structural member, and a panel in which first and second surface members are stacked through a rail member comprising a nonwoven structural member. According to the present invention, since a nonwoven structural member having a sound absorption property is a component member of the panel, it is not necessary to dispose (or arrange) a rail member and a fibrous sound absorption member as separate members, like a conventional sound insulation panel. Thus, the panel has a simple structure and is lightweight, and additionally can express a high sound insulation property without generation of transmission resonance due to the fibrous sound absorption member surrounded by the rail member.

Figure 3:
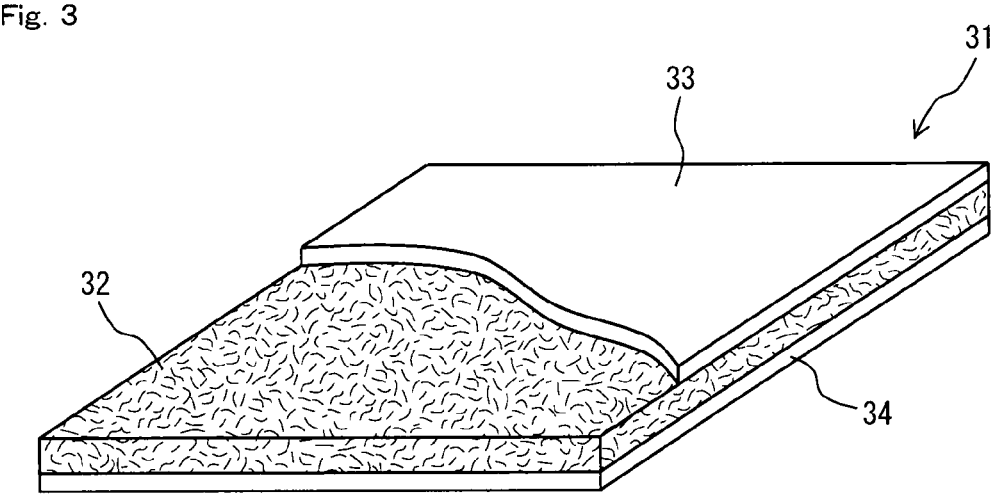
FIG. 3 is a partly broken schematic perspective view showing a soundproof panel in accordance with a still another embodiment of the present invention.

As one example of these panels having a double-wall structure, FIG. 3 represents a partly broken schematic perspective view of a panel structure in which a board-like nonwoven structural member and a surface member are stacked. In FIG. 3, a soundproof panel 31 comprises a board-like nonwoven structural member 32, a first surface member 33 stacked to a first side of the structural member 32, and a second surface member 34 stacked to a second side of the structural member 32. Since the board-like nonwoven structural member 32 has an adequate strength for a shaped product and has a fiber aggregate structure, the nonwoven structural member 32 has a sound insulation property to both solid-borne sound and air-borne sound.

Figure 4:
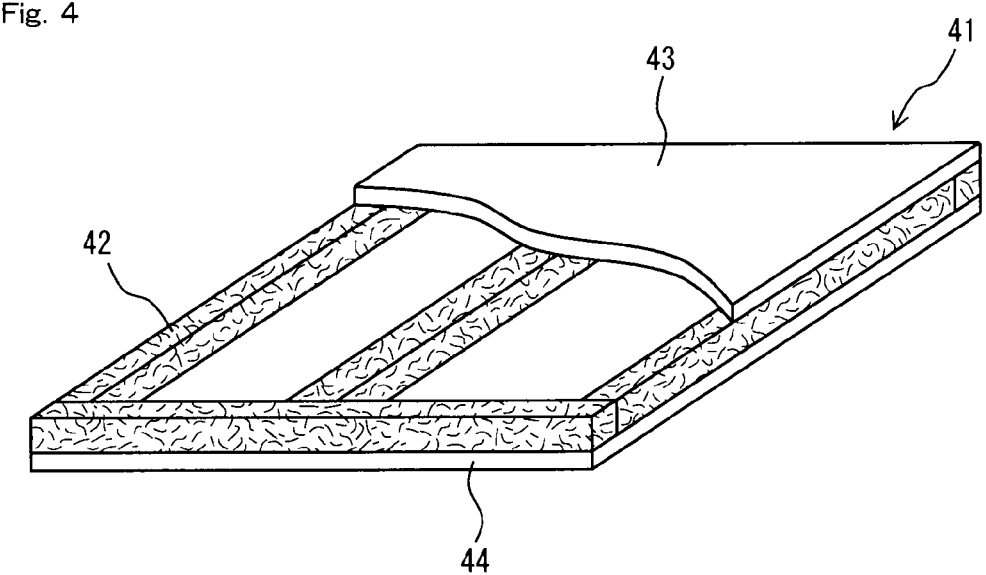
FIG. 4 is a partly broken schematic perspective view showing a soundproof panel in accordance with a further embodiment of the present invention.

On the other hand, FIG. 4 represents a partly broken schematic perspective view of a panel structure in which surface members are stacked through a rail member comprising a nonwoven structural member. In FIG. 4, a soundproof panel 41 comprises a square-pole rail member 42 comprising a nonwoven structural member, and a first surface member 43 and a second surface member 44 which are stacked through the rail member 42. The rail member 42 is disposed at both end regions in a longitudinal direction and both ends and a middle region in a lateral (or crosswise) direction. The soundproof panel 41 has a clearance (a space) between the surface member 43 and the surface member 44 and has an excellent lightness in weight and an excellent sound insulation property of a solid-borne sound. In addition, since the rail member 42 comprises a nonwoven structural member, which is different from a conventional sound insulation panel, the soundproof panel has not only a clearance but also a high sound insulation property to a solid-borne sound which transmits the rail member. In particular, the soundproof panel provided with the rail member has an excellent lightness in weight and high sound absorption and sound insulation properties to a sound wave having a frequency in a high-frequency zone.

It is sufficient that these panels have a nonwoven structural member interposed between a first surface member and a second surface member parallel with each other. The nonwoven structural member and the surface members may be unfixed. In view of versatility, easiness of construction, and others, it is preferable that the nonwoven structural member and the surface members be fixed. For fixation (jointing, coupling, attachment, connection) of the nonwoven structural member and the surface members, an adhesive or a pressure sensitive adhesive may be used, or a clamp (or a brace) may be used.

In the panel having the board-like nonwoven structural member, the thickness ratio of the board-like nonwoven structural member relative to the surface member (when the nonwoven structural member has first and second surface members stacked to first and second sides thereof, respectively, the thickness of the surface member stacked to one side of the nonwoven structural member is regarded as the thickness of the surface member) [the nonwoven structural member/the surface member] may be selected from the range of about 50/1 to 1/2 according to the application or the species of the surface member. For example, the nonwoven structural member/the surface member is about 40/1 to 1/1.5, preferably about 30/1 to 1/1, and more preferably about 20/1 to 1.5/1 (particularly about 10/1 to 2/1). A thin lightweight panel having the thickness ratio in this range can express a sound insulation property to sound waves with a wide range of frequencies. In particular, a panel having the thickness ratio of the nonwoven structural member/the surface member of 25/1 to 1.5/1 (particularly 15/1 to 2/1) achieves a high sound insulation property even at a low-frequency zone. Further, for use of a surface member comprising a synthetic resin board (particularly, a transparent resin board), a soundproof panel having well-balanced lightness in weight and sound insulation property can be prepared by adjusting (regulating) the nonwoven structural member/the surface member to 50/1 to 5/1, preferably 30/1 to 10/1, and more preferably 25/1 to 15/1.

In the panel provided with the rail member comprising the nonwoven structural member, the form or shape of the rail member is not particularly limited to the above-mentioned square pole, and it is sufficient that the rail member has a pair of parallel planes facing each other for contacting the surface member. For example, the form of the contact surface, which is in contact with the surface member, may be a polygonal form such as a triangle or a quadrangle (e.g., a square and a rectangle), a circular form, and an elliptical (or oval) form. Among these forms, in view of the adhesiveness (or bondability) to the surface member and the air tightness, a prismatic form (e.g., a square-pole) is preferred. Further, the contact position of the rail member and the surface member is not particularly limited to the above-mentioned both end regions (border or edge) and the above-mentioned middle region, and may be, for example, each region such as four corners, a central region, or an intermediate region between adjacent two corners, and combination of each region.

In view of the panel strength, a larger contact surface area of the rail member and the surface member is preferred. In contrast, in view of the lightness in weight, translucency and transparency, a smaller contact surface area is preferred. The proportion of the contact surface area of the rail member and the surface member in the whole area of the surface member is, for example, about 5 to 50%, preferably about 10 to 40%, and more preferably about 15 to 30%, depending on the thickness of the rail member. Incidentally, the thickness ratio of the rail member relative to the surface member may be the same as the above-mentioned thickness ratio of the board-like nonwoven structural member relative to the surface member. Further, for a panel provided with the rail member comprising the nonwoven structural member, the panel strength and the translucency may be controlled by regulating (or adjusting) the contact surface area and thickness ratio of the rail member and the surface member, and additionally the basis weight and density of the rail member.

Further, for an application which does not require translucency or transparency, if necessary, a soundproof panel provided with the surface member may comprise a reflector, a covering member, and others, as a stacking member. The reflector or the covering member may be stacked to the first surface member and/or the second surface member, or may be used instead of the second surface member. As a method for fixing the reflector or the covering member, the above-mentioned method using a clamp (or a brace) or the above-mentioned method using an adhesive or a pressure sensitive adhesive may be used.

As the reflector, the same reflector as that to be used for the panel provided with the honeycomb member may be used. Incidentally, as described above, a material (or member) having a reflector function may be used as the surface member. In this description, the reflector means a reflector to be further stacked to the surface member. As the covering member, the same covering member as that to be used for the panel provided with the honeycomb member may be used.

Since the soundproof panel provided with the surface member is formed by firmly adhering (bonding) the nonwoven structural member to the surface member, the soundproof panel has a suitable mechanical strength (e.g., a compressive strength, and a bending strength) for an interior material for building. Thus, reduction of the thickness is allowed, and a lightweight soundproof panel can be produced at a low cost.

(Stacking or Joining Method of Soundproof Panel)

In the soundproof panel of the present invention, as a method for joining the nonwoven structural member to the board member (the honeycomb member or the surface member), in view of the lightness in weight, the productivity, and others, a joining method using an adhesive or a pressure sensitive adhesive is preferred. The adhesive or the pressure sensitive adhesive may be selected according to the material of the structural member, particularly, the material of the board member, and is not particularly limited to a specific one as long as the sound absorption property is not lowered by the adhesive or the pressure sensitive adhesive. The adhesive or the pressure sensitive adhesive may include a polyvinyl acetate-series adhesive, a conventional adhesive (for example, a natural polymer-series adhesive such as a starch or a casein, a thermoplastic resin-series adhesive such as a vinyl-series polymer, a polyester-series resin, or a polyamide-series resin, and a thermosetting resin-series adhesive such as an epoxy resin), a conventional pressure sensitive adhesive (for example, a rubber-series pressure sensitive adhesive and an acrylic pressure sensitive adhesive), and others. Among them, in view of the adhesiveness to a porous material, a polyvinyl acetate-series adhesive, an polyacrylate-series adhesive, a starch-series adhesive, and others are widely used. Further, also as a method for joining the covering member or the reflector, a joining method using an adhesive or a pressure sensitive adhesive is preferred. Depending on the material, a conventional adhesive or a conventional pressure sensitive adhesive may be used. As the adhesive or the pressure sensitive adhesive, various adhesives may suitably be selected and used according to the position to be used or the species of the material.

Incidentally, a method for joining the stacked (or layered) product (for example, a method for joining the nonwoven structural member to the honeycomb member) is not particularly limited to a joining method using the adhesive or pressure sensitive adhesive, and a method using a clamp (or a brace) may be used.

The method using a clamp (or a brace) may include a method fixing the panel with a frame from an outside thereof, a method using an engaging means such as a screw or a bolt, a method using an adhesion tape, a method using a separable fastener (or a hook-and-loop fastener) (a method fixing an end or side of the panel with an adhesion tape or an engaging means).

Among these fixing methods, in view of the lightness in weight, the productivity, and others, a joining method using an adhesive or a pressure sensitive adhesive is preferred. In particular, due to the fiber aggregate structure of the nonwoven structural member, the fiber aggregate structure is impregnated with the adhesive or the pressure sensitive adhesive, and air, which causes deterioration of the adhesion strength of the adhesive, is released to the outside through the fiber aggregate structure. Thus, such a method can achieve a high adhesion strength.

[Sound Absorption or Sound Insulation Structure]

Figure 5:
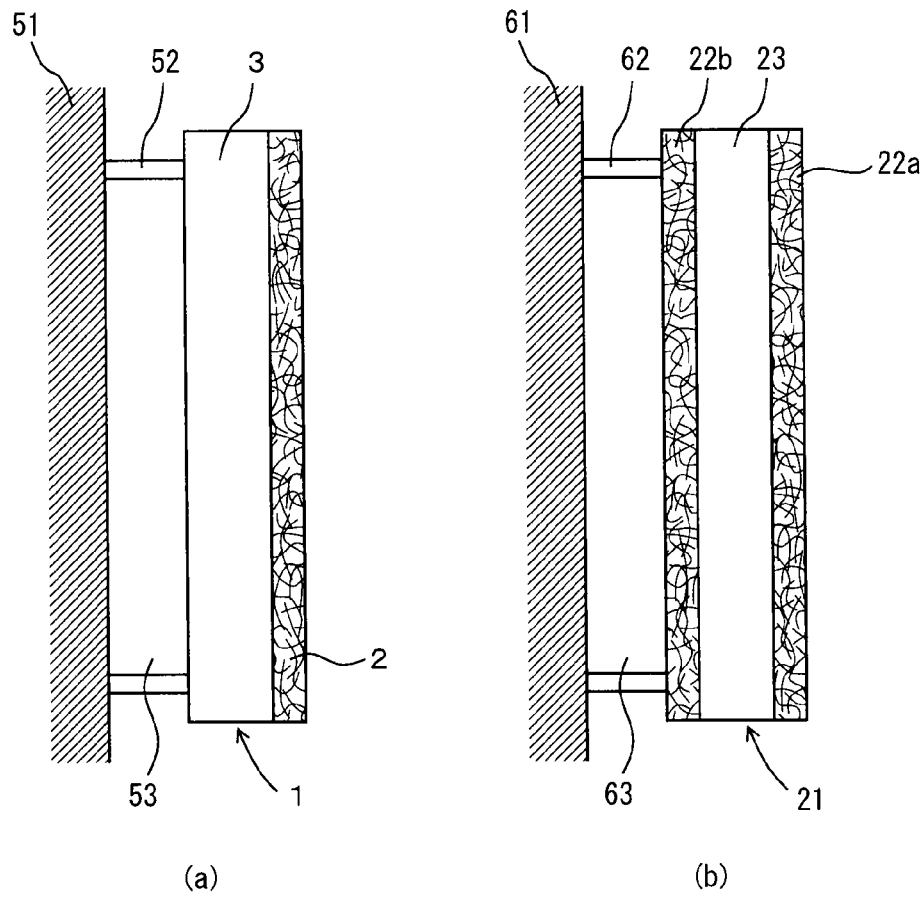
FIG. 5 is a schematic side elevational view showing a sound absorption or sound insulation structure which installs each soundproof panel of FIG. 1 and FIG. 2 in accordance with an embodiment of the present invention.

The sound absorption or sound insulation structure of the present invention is a structure in which the soundproof panel is installed (disposed or arranged) in an object site that requires sound absorption or sound insulation. That is, according to the present invention, both internal and external sounds of an architectural structure can be absorbed or insulated by installing the soundproof panel of the present invention in an object site that requires sound absorption or sound insulation of an object (for example, a wall or ceiling of an architectural structure). FIG. 5 is a schematic side elevational view showing an embodiment of a sound absorption or sound insulation structure which installs each soundproof panel of FIG. 1 and FIG. 2.

In FIG. 5(a), the soundproof panel 1 in which the nonwoven structural member 2 and the paper honeycomb member 3 are stacked (or layered) is installed to allow the paper honeycomb member 3 and a wall 51 to face each other. Further, the soundproof panel 1 is installed in the wall 51 with a support 52 in a state that a back (or rear) air layer 53 is interposed between a wall surface of the wall 51 and a surface of the honeycomb member 3. On the other hand, in FIG. 5(b), the soundproof panel 21, which comprises the paper honeycomb member 23 having the nonwoven structural members 22a and 22b stacked (or attached) to first and second sides thereof, respectively, is installed in a wall 61 with a support 62 in a state that a back (or rear) air layer 63 is interposed between a wall surface of the wall 61 and a surface of the nonwoven structural member 22b.

The thickness of the air layer (back air layer) may suitably be selected according to a space size to be installed or a required sound absorption property. The thickness of the air layer is, for example, about 5 to 100 mm, preferably about 10 to 90 mm, and more preferably about 20 to 80 mm (particularly about 30 to 70 mm). The thickness of the air layer is closely related to a sound absorption zone of frequency. Increase of the thickness of the air layer can improve a sound absorption property at low-frequency zone. Further, use of the panel comprising the honeycomb member and the first and second nonwoven structural members stacked to the first and second sides of the honeycomb member, respectively, can achieve a sound absorption property over a wide range of frequencies from a low-frequency zone to a high-frequency zone.

Thus, in the present invention, the back air layer means an air layer arranged between the soundproof panel and a ceiling surface, a wall surface, or a floor surface when the soundproof panel is installed in a wall, a ceiling, a floor, and others of an architectural structure. According to the present invention, arrangement of the back air layer can further improve a sound absorption performance. In particular, since the soundproof panel of the present invention has a large strength due to stacking (or lamination) of the nonwoven structural member and the honeycomb member, the back air layer is easily arranged. A method for forming the back air layer is not particularly limited to a specific one as long as an air layer can be formed at the back of the soundproof panel, and may suitably be selected depending on an installation location of the soundproof panel. As such a method, in addition to the above-mentioned method using a support, a method stacking (or layering) a cavity box consisting of only framework on the soundproof panel, and other methods may be used.

Incidentally, the soundproof panel may be installed without a back air layer. For example, the soundproof panel may be brought into contact with a wall surface, a ceiling surface, a floor surface, and others. Further, in such a manner, in order to improve the sound absorption property, for example, the same effect can be achieved by increasing the thickness of the honeycomb member.

Further, the soundproof panel of the present invention is also advantageous to construction due to a high rigidity (or stiffness) thereof. That is, the soundproof panel of the present invention has a further feature: even when the soundproof panel is formed as a large-sized one and is installed using a clamp (or a brace) at a large attachment pitch, the shape of the soundproof panel is maintained without any structural problem.

Use of the soundproof panel of the present invention can achieve an excellent sound absorption performance, particularly an excellent sound absorption performance in a low-frequency zone. Specifically, the soundproof panel of the present invention has a sound absorption property to a frequency range perceivable as a sound (about 10 to 20000 Hz) and is usually applied to a frequency of about 100 to 10000 Hz.

In particular, the soundproof panel provided with the honeycomb member is effectively used to absorb or insulate a sound in a low-frequency zone, for example, 200 to 5000 Hz, preferably 300 to 3000 Hz, more preferably 400 to 2500 Hz (particularly, 500 to 2000 Hz) by adjusting (or controlling) the inner volume of the honeycomb member or the back air layer.

The soundproof panel provided with the surface member is effectively used to absorb or insulate a sound in a low-frequency zone, for example, 100 to 5000 Hz, preferably 150 to 3000 Hz, more preferably 200 to 2000 Hz (particularly 250 to 1500 Hz) by adjusting (or controlling) the thickness ratio of the nonwoven structural member relative to the surface member or the density.

Further, in the soundproof panel provided with the surface member, since use of the nonwoven structural member as the rail member in combination with an internal air layer can effectively inhibit a solid-borne sound from the first surface member to the second surface member, the sound reduction index in a frequency zone of not less than 500 Hz (e.g., about 500 to 5000 Hz) can be increased compared with a conventional wood rail member. Specifically, the soundproof panel is particularly effectively used to absorb or insulate a sound in a high-frequency zone, for example, a frequency zone of 1000 to 5000 Hz (e.g., 1000 to 2000 Hz), and also effectively used to absorb or insulate a sound in a frequency zone of 2500 to 4000 Hz. Thus, the soundproof panel is effectively used in a place where loud noise or metallic sound (or metallic noise) or others is generated (for example, a construction site, and an arterial road).

Industrial Applicability

The soundproof panel of the present invention has high sound absorption or sound insulation properties and is effectively available as a sound absorption or sound insulation panel for an architectural structure (for example, a house, a plant installation or equipment, a building, a hospital, a school, a gymnasium, a lyceum, a public hall or community center, a concert hall, a soundproof wall for expressway) or a vehicle (for example, a car such as an automobile, and a flying machine or aircraft), and others. In particular, the soundproof panel is also available as a partition panel, a movable partition panel, a ceiling material, a floor material, a screen, a door, a storm sash, a shutter, and a folding screen which are used for an architectural structure (such as a house or a concert hall) which requires high sound absorption and sound insulation properties and a high strength. Further, by utilizing an excellent air-permeability of the soundproof panel of the present invention, the soundproof panel is also available as a building component (or member) which requires air-permeability.

In particular, since the soundproof panel provided with the honeycomb member also has a high sound absorption property to a low-frequency zone, the panel is suitable for an application requiring a high acoustical equipment such as a concert hall (for example, a panel for a wall, a door or a sliding door (or a shutter), and a ceiling, particularly a wall or partition panel).

Further, among the soundproof panels provided with the surface member, in view of the lightness in weight, the translucency, and others, the panel provided with the rail member comprising the nonwoven structural member is preferable or a panel for a wall, door or sliding door (or shutter), or ceiling of a house, and others (particularly a wall or a partition panel). Further, the soundproof panel also has a high sound absorption property to a high-frequency zone and is also useful as a panel for a residential building around a place where loud noise or metallic sound (or metallic noise) or others is generated [for example, a construction site, an arterial road or an expressway, an airfield (or an airport), an amusement establishment (e.g., a pinball parlor, a karaoke room, and a cyber-cafe (or an internet cafe)), an eating place (a restaurant)].

EXAMPLES

Hereinafter, the following examples are intended to describe this invention in further detail and should by no means be interpreted as defining the scope of the invention. The values of physical properties in Examples were measured by the following methods. Incidentally, the terms "part" and "%" in Examples are by mass unless otherwise indicated.

(1) Melt Index (MI) of Ethylene-Vinyl Alcohol-Series Copolymer

In accordance with JIS K6760, under the condition of a temperature of 190° C. and a load of 21.2 N, the melt index of an ethylene-vinyl alcohol-series copolymer was measured with a melt indexer.

(2) Basis Weight (g/m$^2$)

In accordance with JIS L1913 "Test methods for nonwovens made of staple fibers", the basic weight was measured.

(3) Thickness (mm) and Apparent Density (g/cm$^3$)

In accordance with JIS L1913 "Test methods for nonwovens made of staple fibers", the thickness of the nonwoven structural member was measured, and the apparent density was calculated using the obtained thickness and weight of the structural member.

(4) Air-Permeability

In accordance with JIS L1096, the air-permeability of the nonwoven structural member was measured with a Fragzier method.

(5) Bending Stress

In accordance with A method (three-point bending method), which is one of the methods described in JIS K7017, the bending stress of the nonwoven structural member was measured using a sample having a width of 25 mm and a length of 80 mm under the condition that the distance between supporting points was 50 mm and the test speed was 2 mm/minute. In the present invention, the maximum stress (peak stress) in a chart obtained from the result was defined as the maximum bending stress. Incidentally, the bending stress in the MD direction and the bending stress in the CD direction were measured. Here, the MD direction means a state of a measuring sample after being prepared by cutting a web fiber so as a machine direction (MD direction) of a web fiber to be parallel to the long side of a measuring sample. On the other hand, the CD direction means a state of a measuring sample after being prepared by cutting a web fiber so as a cross direction (CD direction) of a web fiber to be parallel to the long side of a measuring sample.

(6) Stresses at 1.5 Times Bending Deflection

In the measurement of the bending stress, after exceeding the bending deflection (bending displacement) at the maximum bending stress (peak stress), the sample was kept bending until a bending deflection became 1.5 times as large as the bending deflection at the maximum bending stress. The obtained bending stress at 1.5 times bending deflection was the stress at 1.5 times.

(7) Bonded Fiber Ratio

The bonded fiber ratio was obtained by the following method: taking a macrophotography of the cross section with respect to the thickness direction of a structural member (100 magnifications) with the use of a scanning electron microscope (SEM); dividing the obtained macrophotography in a direction perpendicular to the thickness direction equally into three; and in each of the three area [a surface area, an central (middle) area, a backside area], calculating the proportion (%) of the number of the cross sections of two or more fibers melt-bonded to each other relative to the total number of the cross sections of the fibers (end sections of the fibers) by the formula mentioned below. Incidentally, in the contact part or area of the fibers, the fibers just contact with each other or are melt-bonded. The fibers which just contacted with each other disassembled at the cross section of the structural member due to the stress of each fiber after cutting the structural member for taking the microphotography of the cross section. Accordingly, in the microphotography of the cross section, the fibers which still contacted with each other was determined as being bonded.

Bonded fiber ratio(%)=(the number of the cross sections of the fibers in which two or more fibers are bonded)/(the total number of the cross sections of the fibers)×100;

providing that in each microphotography, all cross sections of the fibers were counted, and when the total number of the cross sections of the fibers was not more than 100, the observation was repeated with respect to macrophotographies which was taken additionally until the total number of the cross sections of the fibers became over 100. Incidentally, the bonded fiber ratio of each area was calculated, and the ratio of the minimum value relative to the maximum value (the minimum value/the maximum value) was also calculated.

(8) Absorption Coefficient

An absorption coefficient measurement system provided with an acoustic impedance tube (manufactured by Brueel & Kjaer, an impedance tube with two microphones, Type 4206, large measurement tube) was used to measure a normal incident absorption coefficient in accordance with JIS A-1405.

(9) Sound Reduction Index

In accordance with JIS A1416, the sound reduction index was measured.

(10) Diffusibility of Transmitted Light (45° diffusibility)

When a light entered vertically with respect to a first surface of the nonwoven structural member and was transmitted from a second surface thereof, a transmitted light strength in a direction parallel to the normal line of the second surface and a transmitted light strength in a 45° direction with respect to the normal line of the second surface were measured by a goniometer (manufactured by Murakami Color Research Laboratory Co., Ltd., GP200) to determine the ratio of the both strengths (45° transmitted light strength/parallel transmitted light strength).

Experimental Example 1

(Production Example of Nonwoven Structural Member)

A sheath-core form conjugated staple fiber ("Sofista" manufactured by Kuraray Co., Ltd., having a fineness of 3 dtex, a fiber length of 51 mm, a mass ratio of the sheath relative to the core of 50/50, a number of crimps of 21/25 mm, and a degree of crimp of 13.5%) was prepared as a thermal adhesive fiber under moisture. The core component of the conjugated staple fiber comprised a polyethylene terephthalate and the sheath component of the conjugated staple fiber comprised an ethylene-vinyl alcohol copolymer (the content of ethylene was 44 mol % and the degree of saponification was 98.4 mol %).

Using the sheath-core form conjugated staple fiber, a card web having a basis weight of about 100 g/m$^2$ was prepared by a carding process. Then nine sheets of the card webs were put in layers to give a card web having a total basic weight of about 900 g/m$^2$.

The resulting card web was transferred to a belt conveyor equipped with a 50-mesh stainless-steel endless net having a width of 500 mm. Incidentally, above the belt conveyor, a belt conveyor having the same metal mesh was disposed, the belt conveyors independently revolved at the same speed rate in the same direction, and the clearance between the metal meshes was adjustable arbitrarily.

Then the card web was introduced to a water vapor spraying apparatus attached on the lower belt conveyor. The card web was subjected to a water vapor treatment by spraying the card web (perpendicularly) with a high-temperature water vapor jetted at a pressure of 0.4 MPa from the water vapor spraying apparatus so that the water vapor penetrated the web in the thickness direction of the web to give a shaped product having a nonwoven structure. The water vapor spraying apparatus had a nozzle disposed in the inside of the under conveyor so as to spray to the web with the high-temperature water vapor through the conveyor net. A suction apparatus was disposed inside the upper conveyor. In a downstream side in the web traveling direction with respect to this spraying apparatus, another pair of a nozzle and a suction apparatus in inverse arrangement of the above pair was disposed. In this way, the both surfaces of the web were subjected to the water vapor treatment.

Incidentally, the water vapor spraying apparatus used had nozzles, each having a pore size of 0.3 mm, and these nozzles were arranged in a line parallel to the width direction of the conveyor in a pitch of 1 mm. The processing speed was 3 m/minute, and the clearance (distance) between the upper and lower conveyor belts was disposed was 5 mm. Each of the nozzles was disposed on the backside of the belt so that the nozzle almost contacted with the belt.

The obtained nonwoven structural member (shaped product) had a board-like shape, and very hard compared with a conventional nonwoven fabric. When exceeding the bending stress peak, the obtained structural member neither broke nor showed a sharp decline of the stress. In addition, after conducting the shape retention property test, the changes in the form and the mass of the structural member were not observed, and extremely good results are obtained.

The characteristics of the obtained nonwoven structural member are shown in Table 1.

TABLE 1

| | |
|---|---|
| Basis weight | 888 g/m$^2$ |
| Thickness | 5.73 mm |
| Density | 0.155 g/cm$^3$ |
| Air-permeability | 41.9 cm$^3$/(cm$^2$ · second) |
| Bending stress (MD) | 0.38 MPa |
| Bending stress (CD) | 0.18 MPa |
| Bending stress at 1.5 times bending deflection (MD) | 0.32 MPa |
| Bonded fiber ratio (surface) | 18.4% |
| Bonded fiber ratio (center) | 17.1% |
| Bonded fiber ratio (backside) | 21.9% |
| Uniformity of bonded fiber ratio | 78.1% |

(Honeycomb Member)

As a honeycomb member, a board-like paper honeycomb member having wave-form cells, each having a cell size (average diameter) of 5 mm (manufactured by Nagoya Sinzai Kogyo Co., Ltd., product number "NB NKN") was used. Three kinds of board-like paper honeycomb members (thickness: 10 mm, 20 mm, and 30 mm) were used.

(Test 1)

In order to determine the sound absorption performance of the soundproof panel of the present invention, the following three panels (A) to (C) were examined.

(C) Nonwoven structural member alone (thickness: 5.73 mm, density: 0.155 g/cm$^3$)

(B) Honeycomb member alone (thickness: 10 mm)

(A) Soundproof panel of the present invention shown in FIG. 1 [a panel comprising the honeycomb member (B) and the nonwoven structural member (C) adhered to one side of the structural member (B)]

Figure 6:
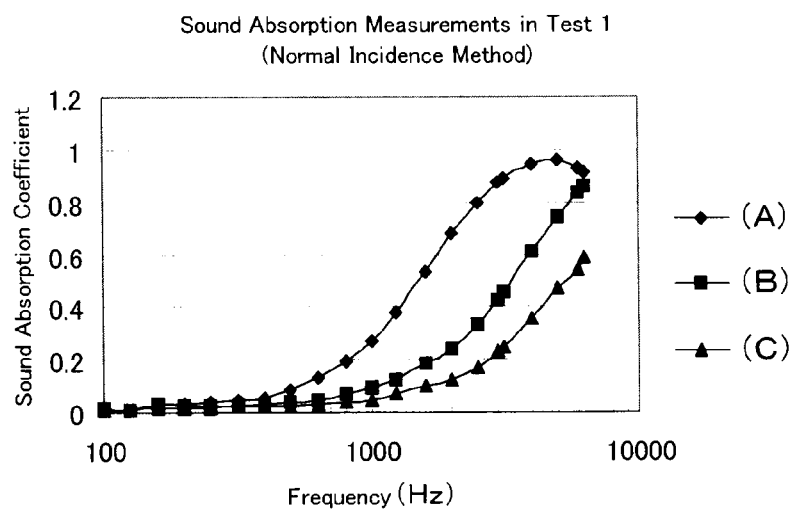
FIG. 6 is a graph representing results of a sound absorption performance test of a soundproof panel in Test 1.

The sound absorption performances of the soundproof panel (A), the honeycomb member (B), and the nonwoven structural member (C) were measured. The results are shown in FIG. 6. The results of FIG. 6 revealed that the sound absorption performance of the soundproof panel (A) of the present invention was excellent compared with each of the nonwoven structural member (C) alone and the honeycomb member (B) alone. In particular, the absorption coefficient of the soundproof panel (A) at a frequency of 1000 to 5000 Hz was higher than the sum of the absorption coefficient of the nonwoven structural member (C) and that of the honeycomb member (B), and the synergic (or multiplier) effects were obtained.

(Test 2)

The effect exerted on the sound absorption performance by the thickness of the honeycomb member for the soundproof panel of the present invention was investigated.

(A10): The same panel as the soundproof panel (A) in Test 1

Figure 7:
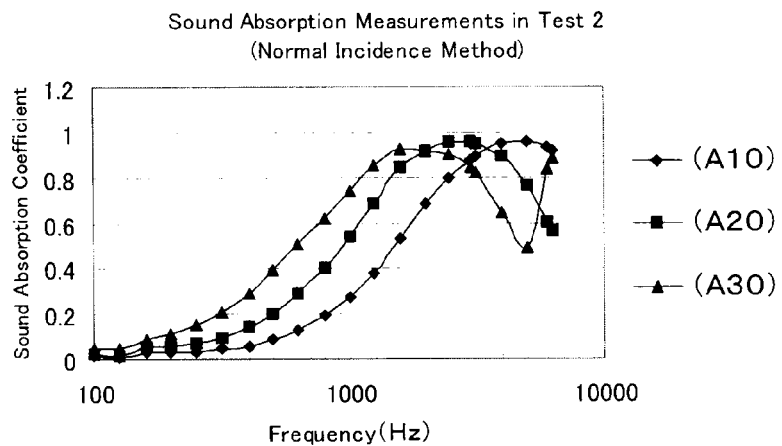
FIG. 7 is a graph representing results of a sound absorption performance test of a soundproof panel in Test 2.

(A20): a panel which is the same as the soundproof panel (A) except for using a honeycomb member having a thickness of 20 mm instead of that having a thickness of 10 mm (A30): a panel which is the same as the soundproof panel (A) except for using a honeycomb member having a thickness of 30 mm instead of that having a thickness of 10 mm The sound absorption performances of the soundproof panel (A10), the soundproof panel (A20), and the soundproof panel (A30) were measured in the same manner as in Test 1. The results are shown in FIG. 7. From the results of FIG. 7, the low-frequency sound absorption coefficient of the soundproof panel having a larger thickness of the honeycomb was markedly improved due to a larger internal space of the honeycomb member.

(Test 3)

In the arrangement of the soundproof panel of the present invention, for the structure having a back air layer (the structure shown in FIG. 5(a)), the effects exerted on the sound absorption performance by the thickness of the back air layer was investigated.

Figure 8:
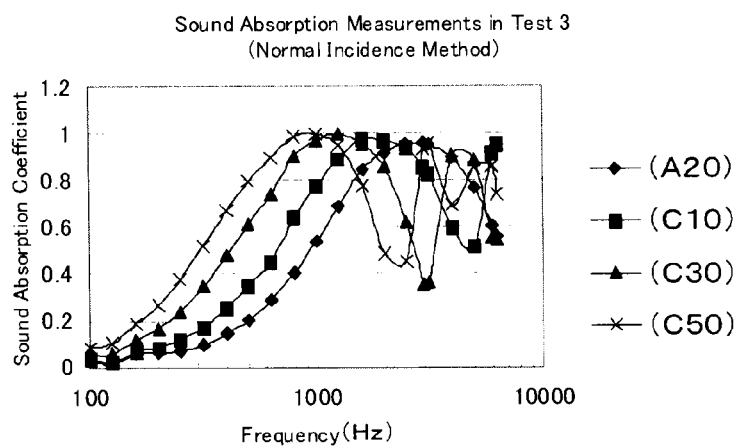
FIG. 8 is a graph representing results of a sound absorption performance test of a soundproof panel in Test 3.

(A20): a structure in which the soundproof panel (A20) is arranged without forming an air layer (C10): a structure in which the soundproof panel (A20) and an air layer having a thickness of 10 mm are arranged (C30): a structure in which the soundproof panel (A20) and an air layer having a thickness of 30 mm are arranged (C50): a structure in which the soundproof panel (A20) and an air layer having a thickness of 50 mm are arranged The sound absorption performances of the structure (A20), the structure (C10), the structure (C30) and the structure (C50) were measured in the same manner as in Test 1. The results are shown in FIG. 8. From the results of FIG. 8, as the thickness of the back air layer was increased, the low-frequency sound absorption coefficient of the soundproof panel was markedly improved.

Experimental Example 2

The sound absorption performance of the soundproof panel comprising a honeycomb member and first and second nonwoven structural members stacked to first and second sides of the honeycomb member, respectively, was investigated.

(Test 4)

(A): the soundproof panel (A) of Test 1

Figure 9:
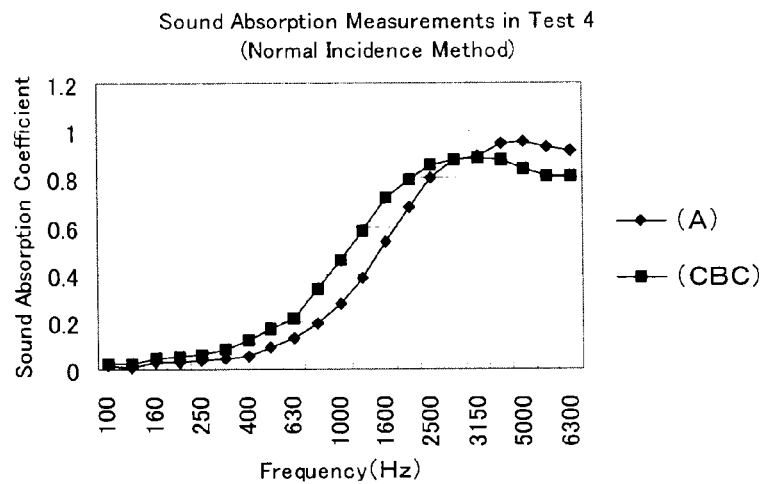
FIG. 9 is a graph representing results of a sound absorption performance test of a soundproof panel in Test 4.

(CBC): a soundproof panel comprising the honeycomb member (B) of Test 1 and first and second nonwoven structural members (C) stacked to first and second sides of the honeycomb member (B), respectively The sound absorption performances of the soundproof panel (A) and the soundproof panel (CBC) were measured in the same manner as in Test 1. The results are shown in FIG. 9. The results of FIG. 9 revealed that, in a low-frequency zone to a middle-frequency zone, the absorption coefficient of the soundproof panel comprising the honeycomb member and the first and second nonwoven structural members stacked to first and second sides of the honeycomb member, respectively, was improved compared with the soundproof panel comprising the honeycomb member and the nonwoven structural member stacked to one side of the honeycomb member.

(Test 5)

For a soundproof panel comprising a honeycomb member and first and second nonwoven structural members stacked to first and second sides thereof, respectively, the effect exerted on the sound absorption performance by the cell size of the honeycomb member was investigated.

(CBC): the same panel as the soundproof panel (CBC) in Test 4

(CE20C): a panel comprising a honeycomb member having a cell size of 35×20 mm (product number No. 35E, manufactured by Nagoya Sinzai Kogyo Co., Ltd.) instead of the honeycomb member (B) in the soundproof panel (CBC) (a panel having a structure as shown in FIG. 2)

(CE30C): a panel comprising a honeycomb member having a cell size of 35×30 mm (product number No. 35E, manufactured by Nagoya Sinzai Kogyo Co., Ltd.) instead of the honeycomb member (B) in the soundproof panel (CBC) (a soundproof panel as shown in FIG. 2)

Figure 10:
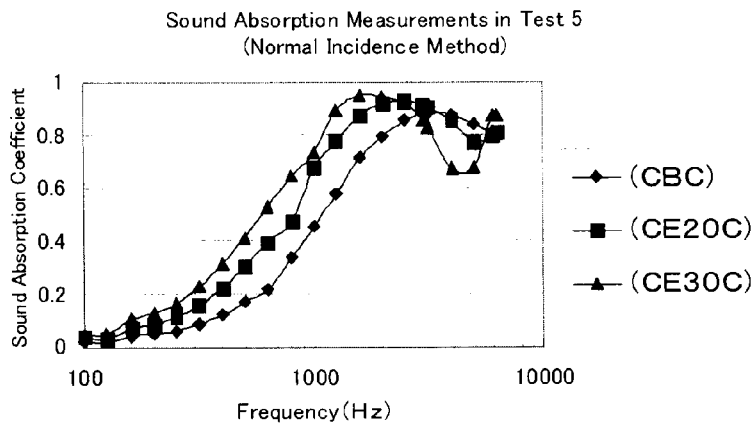
FIG. 10 is a graph representing results of a sound absorption performance test of a soundproof panel in Test 5.

The sound absorption performances of the soundproof panel (CBC), the soundproof panel (CE20C), and the soundproof panel (CE30C) were measured in the same manner as in Test 1. The results are shown in FIG. 10. The results of FIG. 10 revealed that, in the soundproof panel having the first and second shaped products stacked to first and second sides of the honeycomb member, respectively, the sound absorption performance (particularly the sound absorption performance in a low-frequency zone) was improved as the cell size of the honeycomb member was larger.

(Test 6)

In the arrangement of the soundproof panel of the present invention in which the first and second nonwoven structural members were stacked to first and second sides of the honeycomb member, respectively, for the sound absorption or sound insulation structure having a back air layer (a structure as shown in FIG. 5 (b)), the effect exerted on the sound absorption performance by the thickness of the back air layer was investigated.

Figure 11:
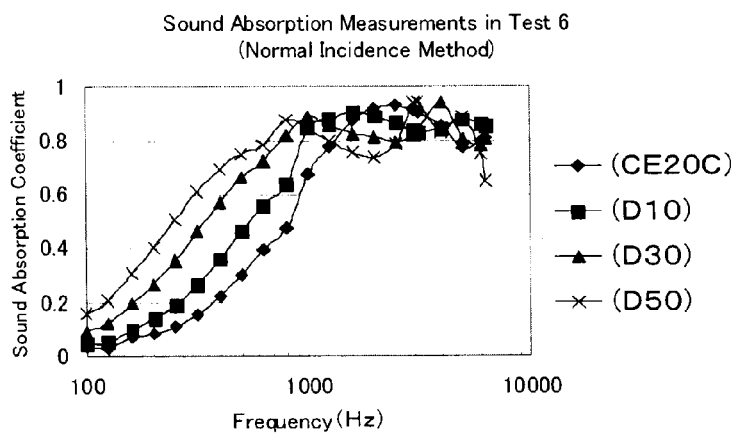
FIG. 11 is a graph representing results of a sound absorption performance test of a soundproof panel in Test 6.

(CE20C): a structure in which the soundproof panel (CE20C) is arranged without an air layer (D10): a structure in which the soundproof panel (CE20C) and an air layer having a thickness of 10 mm are arranged (D30): a structure in which the soundproof panel (CE20C) and an air layer having a thickness of 30 mm are arranged (D50): a structure in which the soundproof panel (CE20C) and an air layer having a thickness of 50 mm are arranged The sound absorption performances of the structure (CE20C), the structure (D10), the structure (D30), and the structure (D50) were measured in the same manner as in Test 1. The results are shown in FIG. 11. From the results of FIG. 11, as the thickness of the back air layer was increased, the low-frequency sound absorption coefficient of the soundproof panel was markedly improved.

Further, the middle-frequency sound absorption coefficients in Tests 1 to 6 are shown in the following Table 2.

TABLE 2

| | | Absorption Coefficient | |
|---|---|---|---|
| Test No. | Sample | 500 Hz | 1000 Hz |
| Test 1 | A | 0.08844 | 0.27213 |
| | B | 0.04092 | 0.09227 |
| | C | 0.02542 | 0.05365 |
| Test 2 | A10 | 0.08844 | 0.27213 |
| | A20 | 0.20185 | 0.54058 |
| | A30 | 0.39154 | 0.74190 |
| Test 3 | A20 | 0.20185 | 0.54058 |
| | C10 | 0.34840 | 0.77444 |
| | C30 | 0.61423 | 0.97200 |
| | C50 | 0.79654 | 0.99720 |
| Test 4 | A | 0.09878 | 0.27069 |
| | CBC | 0.16996 | 0.45527 |

TABLE 2-continued

| Test No. | Sample | Absorption Coefficient | |
| --- | --- | --- | --- |
| | | 500 Hz | 1000 Hz |
| Test 5 | CBC | 0.16996 | 0.45527 |
| | CE20C | 0.30351 | 0.67578 |
| | CE30C | 0.41492 | 0.73327 |
| Test 6 | CE20C | 0.30351 | 0.67578 |
| | D10 | 0.46362 | 0.84801 |
| | D30 | 0.66077 | 0.88992 |
| | D50 | 0.75052 | 0.84826 |

Experimental Example 3

(Production Example of Nonwoven Structural Member)

A sheath-core form conjugated staple fiber ("Sofista" manufactured by Kuraray Co., Ltd., having a fineness of 3 dtex, a fiber length of 51 mm, a mass ratio of the sheath relative to the core of 50/50, a number of crimps of 21/25 mm, and a degree of crimp of 13.5%) was prepared as a thermal adhesive fiber under moisture. The core component of the conjugated staple fiber comprised a polyethylene terephthalate and the sheath component of the conjugated staple fiber comprised an ethylene-vinyl alcohol copolymer (the content of ethylene was 44 mol % and the degree of saponification was 98.4 mol %).

Using the sheath-core form conjugated staple fiber, a card web having a basis weight of about 200 g/m$^2$ was prepared by a carding process. Then ten sheets of the card webs were put in layers to give a card web having a total basic weight of about 2000 g/m$^2$.

The resulting card web was transferred to a belt conveyor equipped with a 50-mesh stainless-steel endless net having a width of 500 mm. Incidentally, above the belt conveyor, a belt conveyor having the same metal mesh was disposed, the belt conveyors independently revolved at the same speed rate in the same direction, and the clearance between the metal meshes was adjustable arbitrarily.

Then the card web was introduced to a water vapor spraying apparatus attached on the lower belt conveyor. The card web was subjected to a water vapor treatment by spraying the card web (perpendicularly) with a high-temperature water vapor jetted at a pressure of 0.4 MPa from the water vapor spraying apparatus so that the water vapor penetrated the web in the thickness direction of the web to give a shaped product having a nonwoven structure. The water vapor spraying apparatus had a nozzle disposed in the inside of the under conveyor so as to spray to the web with the high-temperature water vapor through the conveyor net. A suction apparatus was disposed inside the upper conveyor. In a downstream side in the web traveling direction with respect to this spraying apparatus, another pair of a nozzle and a suction apparatus in inverse arrangement of the above pair was disposed. In this way, the both surfaces of the web were subjected to the water vapor treatment.

Incidentally, the water vapor spraying apparatus used had nozzles, each having a pore size of 0.3 mm, and these nozzles were arranged in a line parallel to the width direction of the conveyor in a pitch of 1 mm. The processing speed was 3 m/minute, and the clearance (distance) between the upper and lower conveyor belts was disposed was adjusted to obtain a structural member having a thickness of 20 mm. Each of the nozzles was disposed on the backside of the belt so that the nozzle almost contacted with the belt.

The obtained nonwoven structural member (shaped product) had a board-like shape, and very hard compared with a conventional nonwoven fabric. When exceeding the bending stress peak, the obtained structural member neither broke nor showed a sharp decline of the stress. In addition, after conducting the shape retention property test, the changes in the form and the mass of the structural member were not observed, and extremely good results are obtained.

The characteristics of the obtained nonwoven structural member are shown in Table 3.

TABLE 3

| | |
| --- | --- |
| Basis weight | 2060 g/m$^2$ |
| Thickness | 20 mm |
| Density | 0.1 g/cm$^3$ |
| Air-permeability | 12.5 cm$^3$/(cm$^2$ · second) |
| Bending stress (MD) | 1.78 MPa |
| Bending stress (CD) | 1.45 MPa |
| Bending stress at 1.5 times bending deflection (MD) | 1.38 MPa |
| Bonded fiber ratio (surface) | 14.3% |
| Bonded fiber ratio (center) | 10.9% |
| Bonded fiber ratio (backside) | 12.8% |
| Uniformity of bonded fiber ratio | 76.2% |

This nonwoven structural member was cut to give a structural member having a plane size of 900 mm×900 mm and a structural member having a plane size of 40 mm×900 mm.

(Surface Member)

As a surface member, a gypsum board having a thickness of 9.5 mm and a density of 0.69 g/cm$^3$ (manufactured by Yoshino Gypsum Co., Ltd.) was used.

Example 1

Figure 12:
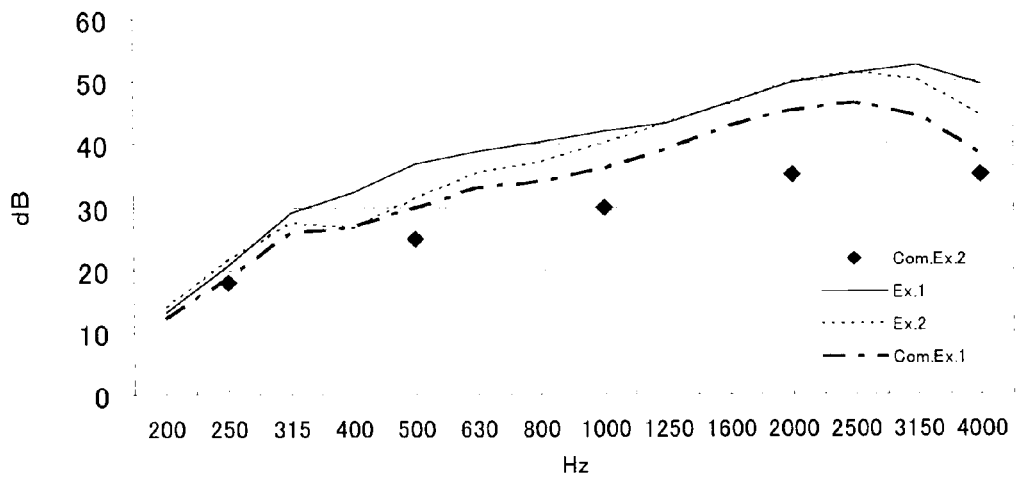
FIG. 12 is a graph representing measured results of a sound reduction index of a soundproof panel in Experimental Example 3.

As shown in FIG. 3, a nonwoven structural member (plane size: the same as the surface member, thickness: 20 mm) was interposed between two surface members (each plane size: 900 mm×900 mm) to arrange a soundproof panel. The sound reduction index of the soundproof panel was measured. The results are shown in FIG. 12. Incidentally, the mass of the panel was 12.6 kg.

Example 2

As shown in FIG. 4, three nonwoven structural members (each plane size: 40 mm in width×900 mm in length, each thickness: 20 mm) as three rail members were interposed between two surface members (each plane size: 900 mm×900 mm) (so that the thickness direction of the nonwoven structural member was parallel to the thickness direction of the panel) to arrange a soundproof panel. The sound reduction index of the soundproof panel was measured. The results are shown in FIG. 12. Incidentally, the mass of the panel was 10.6 kg.

Comparative Example 1

As shown in FIG. 4, three Japan cedar members (each plane size: 40 mm in width×900 mm in length, each thickness: 20 mm) as three wood rail members were interposed between two surface members (each plane size: 900 mm×900 mm) (so that the thickness direction of the wood rail member was parallel to the thickness direction of the panel) to arrange a soundproof panel. The sound reduction index of the soundproof panel was measured. The results are shown in FIG. 12. Incidentally, the mass of the panel was 10.6 kg.

Comparative Example 2

For a gypsum board (manufactured by Yoshino Gypsum Co., Ltd.) commonly used as a sound insulation panel, the sound reduction index was measured. The results are shown in FIG. 12. Incidentally, the mass of the panel was 13.6 kg.

From the results of FIG. 12, the soundproof panels of Examples had a markedly improved sound reduction index effect compared with the commonly used sound insulation panel of Comparative Example 2.

Moreover, almost throughout a range of frequencies, the soundproof panel of Example 1 showed a high sound reduction index effect compared with the sound insulation panel of Comparative Example 1, which was provided with the wood rail member.

Further, at a frequency over 500 Hz, the soundproof panel of Example 2, which was provided with the rail member comprising the nonwoven structural member, showed a high sound reduction index effect compared with the sound insulation panel of Comparative Example 1. Moreover, at a frequency of not lower than 1250 Hz, the sound reduction index effect of the soundproof panel of Example 2 was almost equal to that of the soundproof panel of Example 1.

These results revealed that the soundproof panel having the nonwoven structural member disposed between the gypsum boards exhibited an excellent sound reduction index effect, and that the rail member comprising the nonwoven structural member allowed exhibiting of a high sound reduction index compared with the soundproof panel provided with the wood rail member.

Experimental Example 4

(Nonwoven Structural Member)

The same nonwoven structural member as Experimental Example 3 was used.

(Surface Member)

As surface members, a transparent polyvinyl chloride board having a thickness of 5 mm and a density of 1.48 g/cm$^3$ and a transparent vinyl chloride resin board having a thickness of 4 mm and a density of 1.48 g/cm$^3$ were used.

Example 3

Figure 13:
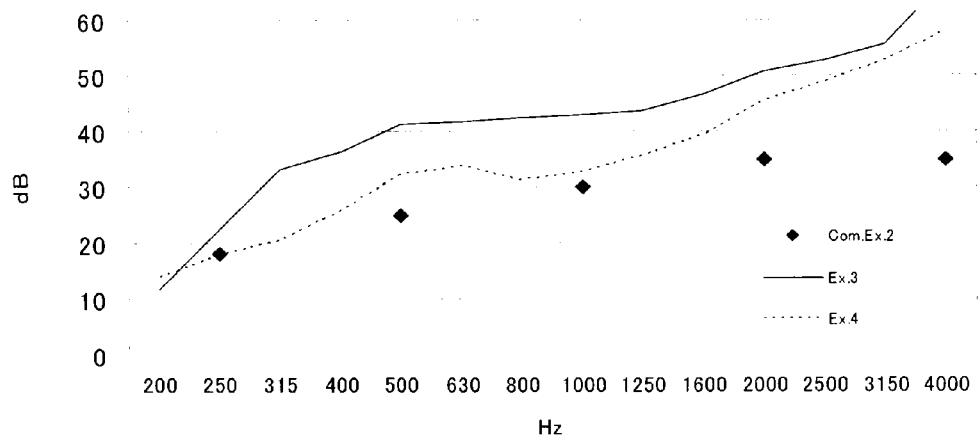
FIG. 13 is a graph representing measured results of a sound reduction index of a soundproof panel in Experimental Example 4.

As shown in FIG. 3, a nonwoven structural member (plate size: the same as the surface member, thickness: 20 mm) was interposed between two surface members (each plane size: 900 mm×900 mm, each thickness: 5 mm and 4 mm) to arrange a soundproof panel. The sound reduction index of the soundproof panel was measured. The results are shown in FIG. 13. Incidentally, the mass of the panel was 12.8 kg.

Example 4

As shown in FIG. 4, three nonwoven structural members (each plane size: 40 mm in width×900 mm in length, each thickness: 20 mm) as three rail members were interposed between two surface members (each plane size: 900 mm×900 mm, each thickness: 5 mm and 4 mm) (so that the thickness direction of the nonwoven structural member was parallel to the thickness direction of the panel) to arrange a soundproof panel. The sound reduction index of the soundproof panel was measured. The results are shown in FIG. 13. Incidentally, the mass of the panel was 10.8 kg.

For comparison, the results of Comparative Example 2 of Experimental Example 3 are also shown in FIG. 13. As apparent from the results of FIG. 13, the soundproof panels of Examples had a markedly improved sound reduction index effect compared with the commonly used sound insulation panel of Comparative Example 2. Moreover, the diffusibility of the transmitted light of the soundproof panel of Example 3 was 71.2%, and the soundproof panel had a light-transmitting property. Further, the soundproof panel of the Example 4 had an excellent visibility due to a large transparent area thereof.

Experimental Example 5

(Nonwoven Structural Member)

A nonwoven structural member having a thickness of 40 mm was produced in the same manner as in the production example of the nonwoven structural member of Experimental Example 3 except that the number of webs to be stacked was doubled and that the clearance (distance) between the upper and lower conveyor belts was adjusted appropriately.

The characteristics of the obtained nonwoven structural member are shown in Table 4.

TABLE 4

| | |
|---|---|
| Basis weight | 4000 g/m$^2$ |
| Thickness | 40 mm |
| Density | 0.1 g/cm$^3$ |
| Air-permeability | 6.2 cm$^3$/(cm$^2$ · second) |
| Bending stress (MD) | 4.23 MPa |
| Bending stress (CD) | 3.64 MPa |
| Bending stress at 1.5 times bending deflection (MD) | 3.68 MPa |
| Bonded fiber ratio (surface) | 26.9% |
| Bonded fiber ratio (center) | 15.4% |
| Bonded fiber ratio (backside) | 23.4% |
| Uniformity of bonded fiber ratio | 57.2% |

This nonwoven structural member was cut to give a structural member having a plane size of 40 mm×900 mm.

(Surface Member)

As a surface member, a transparent vinyl chloride resin board having a thickness of 2 mm and a density of 1.48 g/cm$^3$ was used.

Example 5

Figure 14:
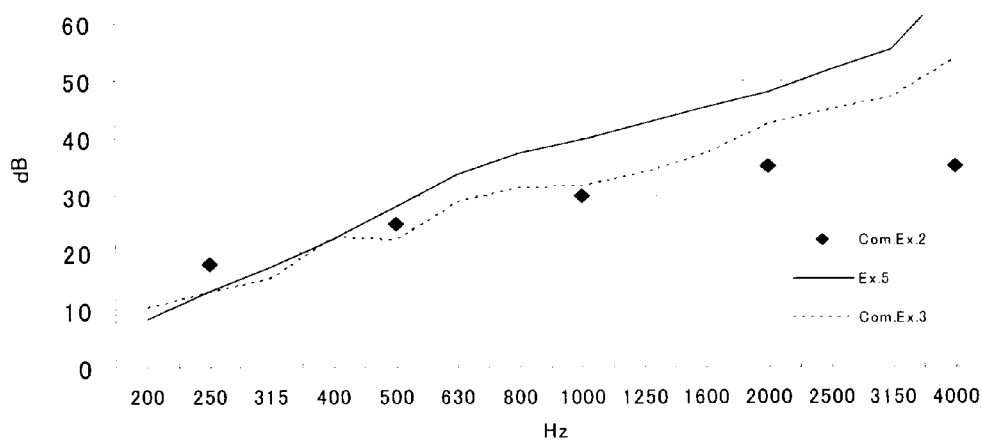
FIG. 14 is a graph representing measured results of a sound reduction index of a soundproof panel in Experimental Example 5.

As shown in FIG. 4, three nonwoven structural members (each plane size: 40 mm in width×900 mm in length, each thickness: 40 mm) as three rail members were interposed between two surface members (each plane size: 900 mm×900 mm) to arrange a soundproof panel. The sound reduction index of the soundproof panel was measured. The results are shown in FIG. 14. Incidentally, the mass of the panel was 4.6 kg.

Comparative Example 3

As shown in FIG. 4, three Japan cedar members (each plane size: 40 mm in width×900 mm in length, each thickness: 40 mm) as three wood rail members were interposed between two surface members (each plane size: 900 mm×900 mm) to arrange a soundproof panel. The sound reduction index of the soundproof panel was measured. The results are shown in FIG. 14. Incidentally, the mass of the panel was 4.6 kg.

For comparison, the results of Comparative Example 2 of Experimental Example 3 are also shown in FIG. 14. From the results of FIG. 14, at a frequency of not lower than 500 Hz, the soundproof panels of Example 5 had an excellent sound insulation property compared with the panel of Comparative Example 2, which was provided with the wood rail member.

Experimental Example 6

(Nonwoven Structural Member)

The nonwoven structural member obtained in Experimental Example 5 (density: 0.1 g/cm³) was cut to give a structural member having a plane size of 900 mm×900 mm.

Further, a nonwoven structural member having a thickness of 40 mm was produced in the same manner as in the production example of the nonwoven structural member of Experimental Example 3 except that the number of webs to be stacked was 8 and that the clearance (distance) between the upper and lower conveyor belts was adjusted appropriately.

The characteristics of the obtained nonwoven structural member are shown in Table 5.

TABLE 5

| | |
|---|---|
| Basis weight | 1600 g/m² |
| Thickness | 40 mm |
| density | 0.04 g/cm³ |
| Air-permeability | 15.0 cm³/(cm² · second) |
| Bending stress (MD) | 0.87 MPa |
| Bending stress (CD) | 0.61 MPa |
| Bending stress at 1.5 times bending deflection (MD) | 0.54 MPa |
| Bonded fiber ratio (surface) | 10.2% |
| Bonded fiber ratio (center) | 9.1% |
| Bonded fiber ratio (backside) | 10.3% |
| Uniformity of bonded fiber ratio | 88.3% |

This nonwoven structural member was cut to give a structural member having a plane size of 900 mm×900 mm.

(Surface Member)

As surface members, a transparent vinyl chloride resin board having a thickness of 2 mm and a density of 1.48 g/cm³, a transparent vinyl chloride resin board having a thickness of 1 mm and a density of 1.48 g/cm³, and an acrylic resin board (a poly(methyl methacrylate) board) having a thickness of 2 mm and a density of 1.18 g/cm³ were used.

Example 6

Figure 15:
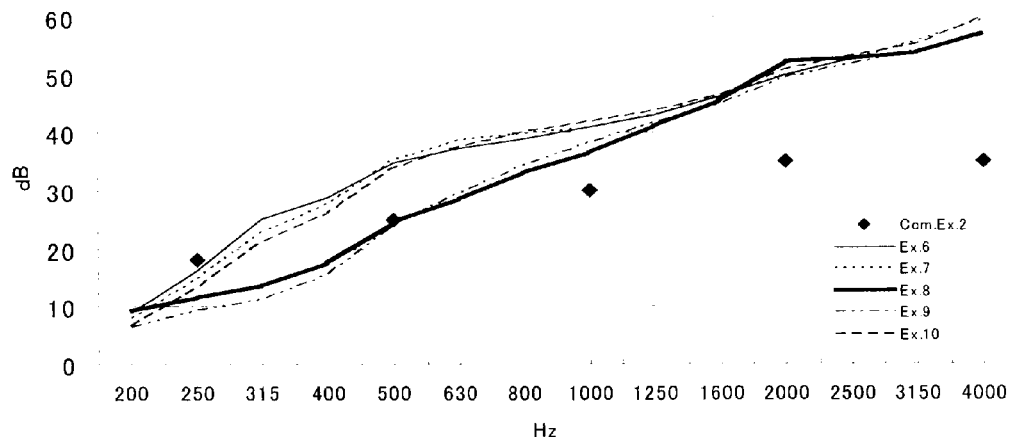
FIG. 15 is a graph representing measured results of a sound reduction index of a soundproof panel in Experimental Example 6.

As shown in FIG. 3, a nonwoven structural member (plane size: the same as the surface member, density: 0.1 g/cm³) was interposed between two surface members (transparent vinyl chloride resin boards, each having a plane size of 900 mm×900 mm and a thickness of 2 mm) to arrange a soundproof panel. The sound reduction index of the soundproof panel was measured. The results are shown in FIG. 15. Incidentally, the mass of the panel was 8 kg.

Example 7

As shown in FIG. 3, a nonwoven structural member (plane size: the same as the surface member, density: 0.04 g/cm³) was interposed between two surface members (transparent vinyl chloride resin boards, each having a plane size of 900 mm×900 mm and a thickness of 2 mm) to arrange a soundproof panel. The sound reduction index of the soundproof panel was measured. The results are shown in FIG. 15. Incidentally, the mass of the panel was 6 kg.

Example 8

As shown in FIG. 3, a nonwoven structural member (plane size: the same as the surface member, density: 0.1 g/cm³) was interposed between two surface members (transparent vinyl chloride resin boards, each having a plane size of 900 mm×900 mm and a thickness of 1 mm) to arrange a soundproof panel. The sound reduction index of the soundproof panel was measured. The results are shown in FIG. 15. Incidentally, the mass of the panel was 6 kg.

Example 9

As shown in FIG. 3, a nonwoven structural member (plane size: the same as the surface member, density: 0.04 g/cm³) was interposed between two surface members (transparent vinyl chloride resin boards, each having a plane size of 900 mm×900 mm and a thickness of 1 mm) to arrange a soundproof panel. The sound reduction index of the soundproof panel was measured. The results are shown in FIG. 15. Incidentally, the mass of the panel was 4 kg.

Example 10

As shown in FIG. 3, a nonwoven structural member (plane size: the same as the surface member, density: 0.04 g/cm³) was interposed between two surface members (acrylic resin boards, each having a plane size of 900 mm×900 mm and a thickness of 2 mm) to arrange a soundproof panel. The sound reduction index of the soundproof panel was measured. The results are shown in FIG. 15. Incidentally, the mass of the panel was 5.6 kg.

For comparison, the results of Comparative Example 2 of Experimental Example 3 are also shown in FIG. 15. From the results of FIG. 15, at a frequency of not higher than 1250 Hz, the transparent vinyl chloride resin board having a larger thickness had a more excellent sound reduction index. However, for the same surface member, the sound reduction index was almost unchanged even when the density of the nonwoven structural member was changed. The nonwoven structural member having a lower density had a lager light-transmittance and reduced the weight of the panel.

Experimental Example 7

(Nonwoven Structural Member)

A nonwoven structural member having a thickness of 30 mm was produced in the same manner as in the production example of the nonwoven structural member of Experimental Example 3 except that the number of webs to be stacked was 15 and that the clearance (distance) between the upper and lower conveyor belts was adjusted appropriately.

The characteristics of the obtained nonwoven structural member are shown in Table 6.

TABLE 6

| | |
|---|---|
| Basis weight | 3000 g/m² |
| Thickness | 30 mm |
| Density | 0.1 g/cm³ |
| Air-permeability | 9.0 cm³/(cm² · second) |
| Bending stress (MD) | 2.06 MPa |
| Bending stress (CD) | 1.52 MPa |
| Bending stress at 1.5 times bending deflection (MD) | 1.73 MPa |
| Bonded fiber ratio (surface) | 27.6% |
| Bonded fiber ratio (center) | 20.0% |
| Bonded fiber ratio (backside) | 25.1% |
| Uniformity of bonded fiber ratio | 72.5% |

This nonwoven structural member was cut to give a structural member having a plane size of 900 mm×900 mm.

(Surface Member)

As a surface member, an acrylic resin board having a thickness of 2 mm and a density of 1.18 g/cm³ was used.

Example 11

Figure 16:
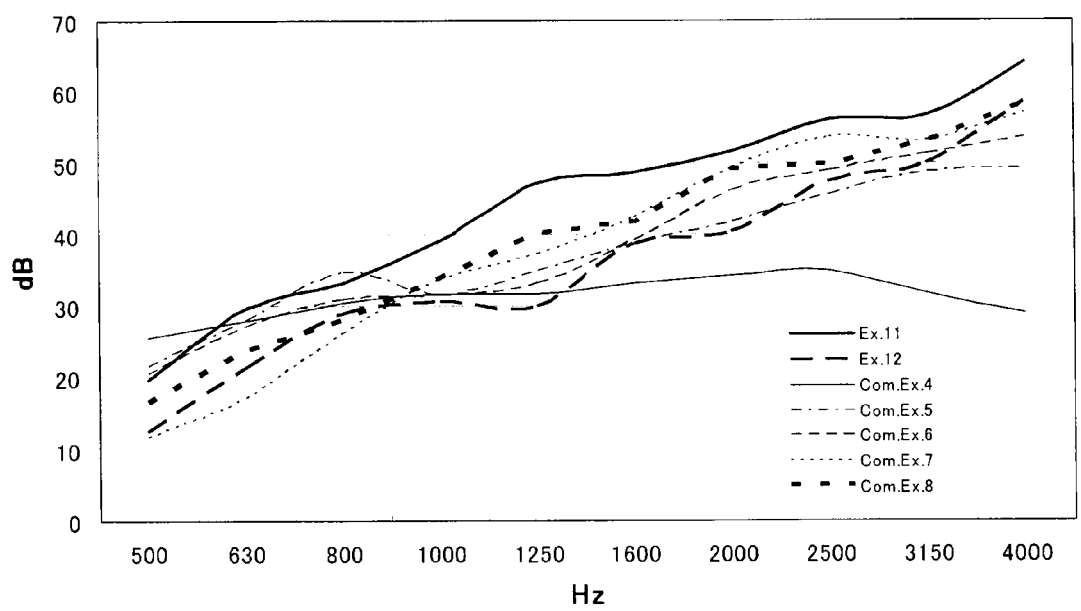
FIG. 16 is a graph representing measured results of a sound reduction index of a soundproof panel in Experimental Example 7.

As shown in FIG. 4, three nonwoven structural members (each plane size: 30 mm in width×900 mm in length, each thickness: 30 mm) as three rail members were interposed between two surface members (each plane size: 900 mm×900 mm) to arrange a soundproof panel. The sound reduction index of the soundproof panel was measured. The results are shown in FIG. 16. Incidentally, the mass of the panel was 4.21 kg.

Example 12

As shown in FIG. 3, a nonwoven structural member (plane size: the same as the surface member) was interposed between two surface members (plane size: 900 mm×900 mm) to arrange a soundproof panel. The sound reduction index of the soundproof panel was measured. The results are shown in FIG. 16. Incidentally, the mass of the panel was 6.3 kg.

Comparative Example 4

For a gypsum board (manufactured by Yoshino Gypsum Co., Ltd.) commonly used as a sound insulation panel, the sound reduction index was measured. The results are shown in FIG. 16. Incidentally, the mass of the panel was 5.5 kg.

Comparative Example 5

As shown in FIG. 4, three Japan cedar members (each plane size: 30 mm in width×900 mm in length, each thickness: 30 mm) as three wood rail members were interposed between two surface members (each plane size: 900 mm×900 mm) to arrange a soundproof panel. The sound reduction index of the soundproof panel was measured. The results are shown in FIG. 16. Incidentally, the mass of the panel was 5.7 kg.

Comparative Example 6

As shown in FIG. 4, three hard polyurethane members (each plane size: 30 mm in width×900 mm in length, each thickness: 30 mm) as three rail members were interposed between two surface members (each plane size: 900 mm×900 mm) to arrange a soundproof panel. The sound reduction index of the soundproof panel was measured. The results are shown in FIG. 16. Incidentally, the mass of the panel was 4.2 kg.

Comparative Example 7

As shown in FIG. 4, three highly-expanded polyethylene members (each plane size: 30 mm in width×900 mm in length, each thickness: 30 mm) as three rail members were interposed between two surface members (each plane size: 900 mm×900 mm) to arrange a soundproof panel. The sound reduction index of the soundproof panel was measured. The results are shown in FIG. 16. Incidentally, the mass of the panel was 3.9 kg.

Comparative Example 8

As shown in FIG. 4, three needle-punched nonwoven fabrics (each plane size: 30 mm in width×900 mm in length, each thickness: 30 mm) as three rail members were interposed between two surface members (each plane size: 900 mm×900 mm) to arrange a soundproof panel. The sound reduction index of the soundproof panel was measured. The results are shown in FIG. 16. Incidentally, the mass of the panel was 5 kg.

From the results of FIG. 16, the soundproof panels of Examples had an excellent sound reduction index in a wide range of frequencies. In particular, at a frequency zone of not lower than 500 Hz (particularly a high-frequency zone of not lower than 1000 Hz), the panel provided with the rail member comprising the nonwoven structural member had an excellent sound reduction index compared with the panel provided with the board-like nonwoven structural member.

Incidentally, the needle-punched nonwoven fabric is a nonwoven fabric formed by needle-punching using a needle with one barb under conditions of a needle depth of 34 mm, a process speed of 2 m/minute, and a total punching number of 300 punches/cm$^2$, instead of the adhesion under moisture with a water-vapor treatment in the production of the nonwoven structural member of Example 11. The resulting nonwoven fabric had a low rigidity (or stiffness) and was not self-supported. Moreover, for the rail member cut into 30 mm in width, loose fibers were observed from the cut surface thereof. Further, when a pressure was applied to the rail member toward a thickness direction thereof, the rail member exhibited an easily deforming (or depressing) property. For example, when the rail member was pressed by a finger, the fingertip was inserted into the nonwoven fabric.

DESCRIPTION OF REFERENCE NUMERALS 1, 21, 31, 41 . . . Soundproof panel
2, 22a, 22b, 32 . . . Nonwoven structural member
3, 23 . . . Honeycomb member
33, 34, 43, 44 . . . Surface member
42 . . . Rail member
51, 61 . . . Wall
52, 62 . . . Support
53, 63 . . . Back air layer

The invention claimed is:

1. A soundproof panel comprising
a first nonwoven structural member in the form of a board comprising a plurality of thermal adhesive fibers melt bonded under moisture with a thermal adhesive resin forming a continuous area of the surface of the fibers in a longitudinal direction thereof,
wherein the thermal adhesive fibers are arranged in a direction approximately parallel to a surface direction of the first nonwoven structural member, and
a honeycomb member having a honeycomb structure,
wherein the first nonwoven structural member has a bonded fiber ratio of 3 to 85% and an apparent density 0.05 to 0.7 g/cm$^3$,
wherein the bonded fiber ratio is 3 to 85% in each of three areas and the proportion of the minimum value relative to the maximum value among the bonded fiber ratios in each of the three areas is not less than 50%, providing that the three areas are obtained by cutting the first nonwoven structural member in the thickness direction for giving a cross section, and dividing the cross section in a direction perpendicular to the thickness direction equally into three,
wherein the first nonwoven structural member has a maximum bending stress of not less than 0.05 MPa in at least one direction, and a bending stress of not less than 1/5 of the maximum bending stress at 1.5 times as large as a bending deflection at the maximum bending stress,
wherein the soundproof panel has a coefficient of sound absorption from 500 to 5000 Hz that is greater than the cumulative coefficient of sound absorption of the first nonwoven structural member and the honeycomb member.

2. The soundproof panel according to claim 1, wherein the soundproof panel has a coefficient of sound absorption from 1000 to 5000 Hz that is greater than the cumulative coefficient of sound absorption of the first nonwoven structural member and the honeycomb member.

3. A soundproof panel according to claim 1, wherein the honeycomb structure is in the form of a board comprising a plurality of thin sheets or a continuous thin sheet, each of the thin sheets or the continuous thin sheet has a thickness of 0.01 to 5 mm, the board has a thickness of 5 to 200 mm, and the honeycomb structure has cells, each having an average diameter of 1 to 100 mm.

4. A soundproof panel according to claim 1, wherein the first nonwoven structural member and the honeycomb structure are in the form of a board, the thickness ratio of the first nonwoven structural member relative to the honeycomb structure [the first nonwoven structural member/the honeycomb structure] is 1/1 to 1/10.

5. A soundproof panel according to claim 1, which further comprises a second nonwoven structural member, wherein the first and second nonwoven structural members and the honeycomb structure are in the form of a board, and the first nonwoven structural member is stacked to a first side of the honeycomb structure, and the second nonwoven structural member is stacked to a second side of the honeycomb structure.

6. A soundproof panel according to claim 1, which further comprises a reflector, wherein the first nonwoven structural member and the honeycomb structure are in the form of a board, the first nonwoven structural member is stacked to a first side of the honeycomb structure, and the reflector is stacked to a second side of the honeycomb structure.

7. The soundproof panel according to claim 1, wherein the apparent density of the first nonwoven structural member is from 0.06 to 0.7 g/cm$^3$.

8. A soundproof panel, comprising:
a rail member comprising a nonwoven structural member in the form of a board, and first and second surface members,
wherein the first and second surface members are stacked through the rail member, and the thermal adhesive fibers are arranged in a direction approximately parallel to a surface direction of the first nonwoven structural member,
the proportion of the contact surface area of the rail member and the surface member in the whole area of the surface member is 5 to 50%, and
wherein the nonwoven structural member comprises a plurality of thermal adhesive fibers melt bonded under moisture with a thermal adhesive resin forming a continuous area of the surface of the fibers in a longitudinal direction thereof, and has a bonded fiber ratio of 3 to 85% and an apparent density of 0.05 to 0.5 g/cm$^3$,
wherein the bonded fiber ratio is 3 to 85% in each of three areas and the proportion of the minimum value relative to the maximum value among the bonded fiber ratios in each of the three areas is not less than 50%, providing that the three areas are obtained by cutting the first nonwoven structural member in the thickness direction for giving a cross section, and dividing the cross section in a direction perpendicular to the thickness direction equally into three,
wherein the first nonwoven structural member has a maximum bending stress of not less than 0.05 MPa in at least one direction, and a bending stress of not less than 1/5 of the maximum bending stress at 1.5 times as large as a bending deflection at the maximum bending stress,
wherein the soundproof panel has a coefficient of sound absorption from 500 to 5000 Hz that is greater than the cumulative coefficient of sound absorption of the first nonwoven structural member and the honeycomb member.

9. A soundproof panel according to claim 8, which has a thickness of 20 to 100 mm, wherein the thickness ratio of the first nonwoven structural member relative to each surface member as the first nonwoven structural member/each surface member is 50/1 to 1/2.

10. A soundproof panel according to claim 8, wherein
the first and second surface members have a translucency,
when a light enters vertically with respect to a first surface of the first nonwoven structural member and is transmitted from a second surface thereof, the ratio of a transmitted light strength in a 45° direction with respect to a normal line of the second surface relative to a transmitted light strength in a direction parallel to the normal line is not less than 50%, and
the thickness ratio of the first nonwoven structural member relative to each surface member as the first nonwoven structural member/the each surface member is 30/1 to 10/1.

11. A soundproof panel according to claim 8, wherein the first nonwoven structural member is joined to the first and second surface members with an adhesive or a pressure sensitive adhesive.

12. A soundproof structure comprising the soundproof panel recited in claim 1 installed in an object site.

13. A soundproof structure according to claim 12, which has an air layer lying between the soundproof panel and the object site that requires sound absorption or sound insulation.

14. A soundproof structure according to claim 13, wherein the air layer has a thickness of 5 to 100 mm 15. A method for soundproofing an object comprising adding the soundproof panel recited in claim 1.

16. The soundproof panel according to claim 8, wherein the soundproof panel has a coefficient of sound absorption from 1000 to 5000 Hz that is greater than the cumulative coefficient of sound absorption of the first nonwoven structural member and the honeycomb member.

17. A soundproof structure comprising the soundproof panel recited in claim 8 installed in an object site.

18. A soundproof structure according to claim 17, which has an air layer lying between the soundproof panel and the object site that requires sound absorption or sound insulation.

19. A soundproof structure according to claim 18, wherein the air layer has a thickness of 5 to 100 mm.

20. A method for soundproofing an object comprising adding the soundproof panel recited in claim 8.

* * * * *